US012483881B2

(12) United States Patent
Kim et al.

(10) Patent No.: US 12,483,881 B2
(45) Date of Patent: Nov. 25, 2025

(54) ENCRYPTING DISCOVERY MESSAGES

(71) Applicant: QUALCOMM Incorporated, San Diego, CA (US)

(72) Inventors: Hongil Kim, San Diego, CA (US); Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 18/165,269

(22) Filed: Feb. 6, 2023

(65) Prior Publication Data

US 2023/0362633 A1 Nov. 9, 2023

Related U.S. Application Data

(60) Provisional application No. 63/267,664, filed on Feb. 7, 2022.

(51) Int. Cl.
*H04W 12/037* (2021.01)
*H04L 9/08* (2006.01)
(Continued)

(52) U.S. Cl.
CPC ......... *H04W 12/037* (2021.01); *H04L 9/0861* (2013.01); *H04W 12/63* (2021.01); *H04W 48/08* (2013.01)

(58) Field of Classification Search
CPC ... H04W 12/037; H04W 12/63; H04W 48/08; H04L 9/0861
(Continued)

(56) References Cited

U.S. PATENT DOCUMENTS 5,872,846 A 2/1999 Ichikawa
6,810,387 B1 * 10/2004 Yim ................... H04N 21/4147
380/232
(Continued)

FOREIGN PATENT DOCUMENTS

CN 114697945 A 7/2022
WO 2016164164 A1 10/2016

OTHER PUBLICATIONS

3GPP TS33.303: "3rd Generation Partnership Project" vol. SAWG3, No. V17.0.0 (Dec. 2021), Dec. 23, 2021, pp. 1-91. (Year: 2021).*
(Continued)

*Primary Examiner* — Thanh T Le
(74) *Attorney, Agent, or Firm* — Procopio, Cory, Hargreaves & Savitch

(57) ABSTRACT

Methods, apparatuses, and computer-readable storage medium for encrypting discovery messages are provided. An example method at a first UE may include obtaining a discovery message that is ciphered based on at least one of a ciphering key, a ciphering algorithm, or a first set of time parameters, where the discovery message is scrambled based on at least one of a scrambling key, a scrambling algorithm, or a second set of time parameters. An example method may also include descrambling the discovery message based on at least one of the scrambling key, the scrambling algorithm, or the second set of time parameters. An example method may also include deciphering the discovery message based on at least one of the ciphering key, the ciphering algorithm, or the first set of time parameters.

30 Claims, 15 Drawing Sheets

(51) Int. Cl.
*H04W 12/63* (2021.01)
*H04W 48/08* (2009.01)

(58) Field of Classification Search
USPC ........................................................ 713/160
See application file for complete search history.

(56) References Cited

U.S. PATENT DOCUMENTS

| | | | | |
|---|---|---|---|---|
| 7,062,043 | B1* | 6/2006 | Solinas | H04L 9/3066 |
| | | | | 708/490 |
| 7,636,846 | B1* | 12/2009 | Eskicioglu | H04N 7/1675 |
| | | | | 713/176 |
| 8,332,657 | B1* | 12/2012 | Eskicioglu | H04N 7/163 |
| | | | | 726/28 |
| 9,357,432 | B2* | 5/2016 | Khayrallah | H04L 9/16 |
| 11,615,716 | B2* | 3/2023 | Ghosh | H04L 9/0631 |
| | | | | 380/28 |
| 11,617,077 | B2* | 3/2023 | Kolekar | H04W 8/24 |
| | | | | 713/181 |
| 11,646,883 | B2* | 5/2023 | Kampanakis | H04L 9/0875 |
| | | | | 380/35 |
| 11,716,614 | B2* | 8/2023 | Hess | H04W 4/50 |
| | | | | 380/270 |
| 11,751,049 | B2* | 9/2023 | Nix | H04W 12/0431 |
| | | | | 726/2 |
| 11,784,985 | B2* | 10/2023 | Graber | H04L 9/0861 |
| | | | | 713/153 |
| 2006/0190728 | A1 | 8/2006 | Veiseh et al. | |
| 2007/0098165 | A1* | 5/2007 | Yoshikawa | H04N 7/163 |
| | | | | 348/E7.056 |
| 2009/0296935 | A1 | 12/2009 | Kendall et al. | |
| 2010/0100747 | A1* | 4/2010 | Boscher | H04L 9/0869 |
| | | | | 380/46 |
| 2011/0225417 | A1* | 9/2011 | Maharajh | H04L 65/752 |
| | | | | 713/150 |
| 2012/0051541 | A1* | 3/2012 | Wang | H04N 21/2347 |
| | | | | 380/255 |
| 2012/0213373 | A1* | 8/2012 | Xin | H04W 12/037 |
| | | | | 380/287 |
| 2013/0254531 | A1* | 9/2013 | Liang | H04L 63/164 |
| | | | | 713/151 |
| 2014/0013104 | A1* | 1/2014 | Vinnik | H04L 63/123 |
| | | | | 713/150 |
| 2014/0344578 | A1* | 11/2014 | Kim | H04W 12/037 |
| | | | | 713/168 |
| 2014/0373042 | A1* | 12/2014 | Le Pelerin | H04N 21/4623 |
| | | | | 725/31 |
| 2015/0270975 | A1* | 9/2015 | Buckley | H04W 4/12 |
| | | | | 713/176 |
| 2016/0100305 | A1* | 4/2016 | Karampatsis | H04W 8/005 |
| | | | | 370/328 |
| 2016/0302137 | A1* | 10/2016 | Escott | H04W 12/106 |
| 2017/0201934 | A1* | 7/2017 | Kim | H04W 48/18 |
| 2018/0115416 | A1* | 4/2018 | Diehl | H04L 9/0819 |
| 2022/0248221 | A1* | 8/2022 | Nix | H04W 12/02 |
| 2023/0077391 | A1* | 3/2023 | Guo | H04W 12/106 |
| | | | | 726/26 |
| 2023/0087265 | A1* | 3/2023 | Wang | H04L 9/14 |
| | | | | 726/6 |
| 2023/0136288 | A1* | 5/2023 | Lim | H04L 63/0823 |
| | | | | 726/4 |
| 2023/0239138 | A1* | 7/2023 | Roach | H04L 9/40 |
| | | | | 713/171 |
| 2025/0008321 | A1* | 1/2025 | Garcia Morchon | H04L 9/0656 |

OTHER PUBLICATIONS

3GPP TS 33.303: "3rd Generation Partnership Project; Technical Specification Group Services and System Aspects; Proximity-based Services (ProSe); Security aspects (Release 17)", 3GPP Standard, Technical Specification, 3rd Generation Partnership Project, Mobile Competence Centre, 650, Route Des Lucioles, F-06921 Sophia-Antipolis Cedex, France, vol. SA WG3, No. V17.0.0 (Dec. 2021), Dec. 23, 2021, pp. 1-91, XP052083364.
Partial International Search Report—PCT/US2023/012500—ISA/EPO—May 16, 2023; 11 pages.
International Search Report and Written Opinion—PCT/US2023/012500—ISA/EPO—Jul. 7, 2023.
Qualcomm Incorporated: "Discussion on Potential Security Mechanisms for Protecting ProSe Disocovery Message", S3-220325, Revision of S3-22xxxx, 3GPP TSG-SA3 Meeting #106-e e-meeting, Feb. 14-25, 2022, 2 Pages.

* cited by examiner

ENCRYPTING DISCOVERY MESSAGES

CROSS REFERENCE TO RELATED APPLICATION(S)

This application claims the benefit of and priority to U.S. Provisional Application Ser. No. 63/267,664, entitled "ENCRYPTING DISCOVERY MESSAGES" and filed on Feb. 7, 2022, which is expressly incorporated by reference herein in its entirety.

TECHNICAL FIELD

The present disclosure relates generally to communication systems, and more particularly, to wireless communication systems with proximity services (ProSe).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. Some features of wireless communication systems may present challenges in terms of security. Moreover, any advances in wireless communication systems may also present a corresponding security challenge.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus. The apparatus may be a user equipment (UE). The apparatus may also include a memory and at least one processor coupled to the memory. The apparatus may transmit, to a network entity prior to obtaining a discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm. The apparatus may also receive, from the network entity prior to obtaining the discovery message, a discovery response message including ProSe code, where the discovery response message further includes a chosen ciphering algorithm in the list of supported ciphering algorithms associated with the UE. The apparatus may also obtain, prior to obtaining a discovery message, a mask (e.g., a bitmask) from a network entity, where the first portion of the discovery message is indicated by the mask (e.g., a bitmask). The apparatus may also obtain, prior to obtaining a discovery message, an indication of the scrambling algorithm and the scrambling key, where the scrambling algorithm is different from the ciphering algorithm and the scrambling key is different from the ciphering key. Additionally, the apparatus may obtain, prior to obtaining a discovery message, an indication of the ciphering algorithm and a security key; and derive a ciphering key based on at least one of the security key or the first set of time parameters. The apparatus may also obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters. The apparatus may also descramble the discovery message based on at least one of the scrambling key, the scrambling algorithm, or the second set of time parameters. Further, the apparatus may decipher the discovery message based on at least one of the ciphering key, the ciphering algorithm, or the first set of time parameters. The apparatus may also cipher, prior to transmitting a response message, the response message based on at least one of the ciphering key, the ciphering algorithm, or the first set of time parameters; and scramble, after ciphering the response message and prior to transmitting the response message, the response message based on at least one of the scrambling key, the scrambling algorithm, or the second set of time parameters. The apparatus may also transmit, to a second UE, a response message in response to the discovery message, where the response message is a second discovery message that includes at least response code.

In an aspect of the disclosure, a method, a computer-readable medium, and an apparatus. The apparatus may be a network entity. The apparatus may also include a memory and at least one processor coupled to the memory. The apparatus may receive a first discovery request message including a restricted proximity services (ProSe) application user identifier (RPAUID), where the first discovery request message further includes a sidelink user equipment (UE) security capability representing a first list of supported ciphering algorithms associated with a first UE. The apparatus may also transmit a first discovery response message including ProSe code, where the first discovery response message further includes a chosen ciphering algorithm in the first list of supported ciphering algorithms associated with the first UE. The apparatus may also transmit a mask for the first UE, where the first portion of the discovery message is indicated by the mask. Additionally, the apparatus may transmit, for the first UE, an indication of the scrambling algorithm and the scrambling key, where the scrambling algorithm is different from the ciphering algorithm and the scrambling key is different from the ciphering key. The apparatus may also perform at least one of: (1) a first authorization procedure based on at least one of the first discovery request message or the first discovery response message or (2) a second authorization procedure based on at least one of the second discovery request message or the second discovery response message. The apparatus may also receive, from a second network entity after transmitting the first discovery response message, a second discovery request message further including a sidelink UE security capability representing a second list of supported ciphering algorithms associated with a second UE. The apparatus may also transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
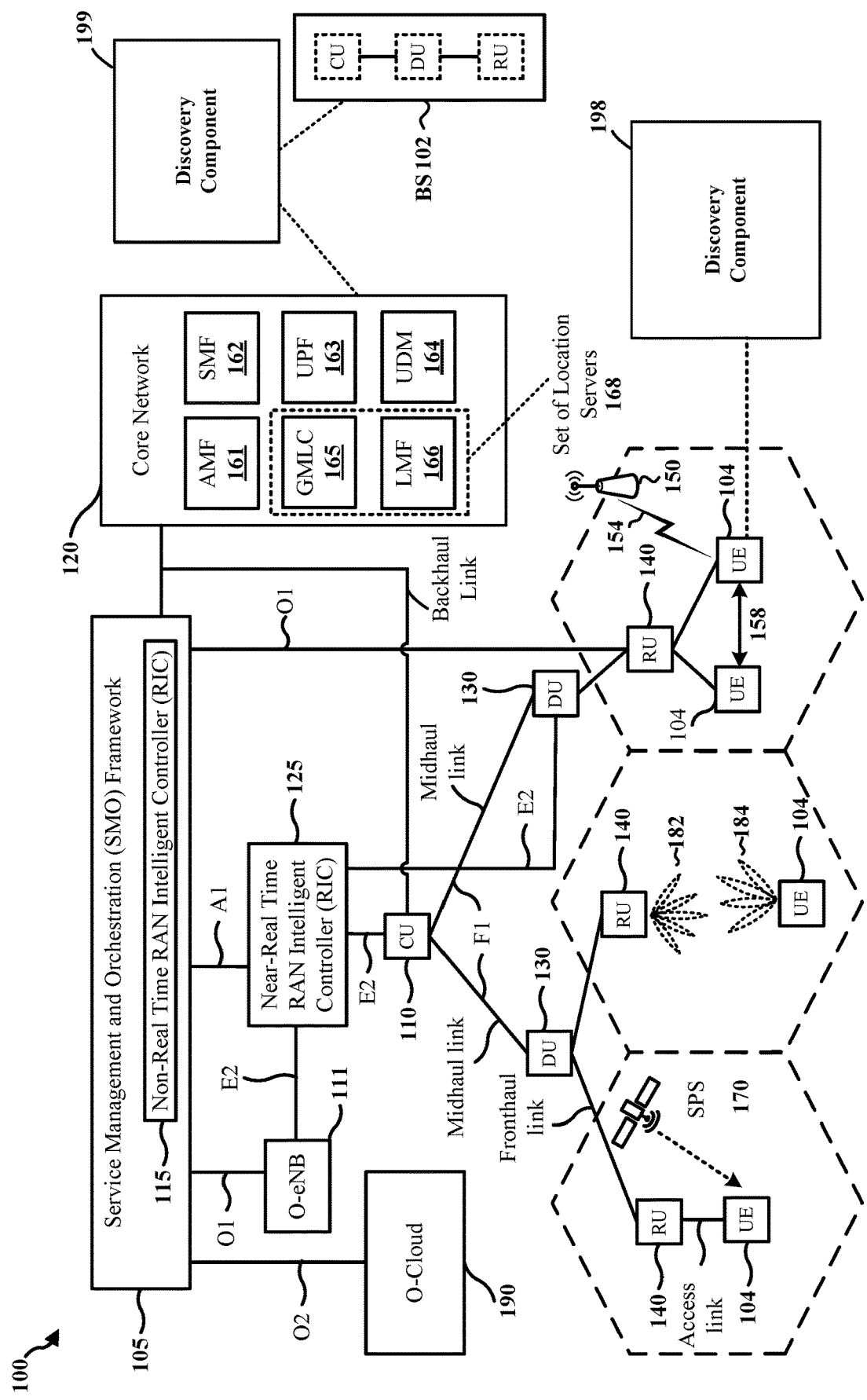
FIG. 1 is a diagram illustrating an example of a wireless communications system and an access network, in accordance with various aspects of the present disclosure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some wireless communication systems, the protection of the discovery messages over the PC5 interface may follow defined protection mechanisms. For example, the security mechanisms for scrambling protection and message-specific confidentiality protection may have a limitation on the size of discovery messages, as keystreams may rely on the output of key derivation function (KDF). However, discovery messages may contain a metadata information element (IE) that has a variable length. In addition, discovery messages for group member discovery may contain an application layer group ID, which can be between 2 and 256 bytes in length. Thus, if the size of the message to be protected is greater than 256 bits due to the metadata IE or application layer group ID, such a mechanism for scrambling and message-specific confidentiality protection may not be applied. Aspects presented herein may provide message-specific confidentiality protection using a ciphering algorithm and scrambling protection using a scrambling algorithm. Additionally, aspects presented herein may allow an entire discovery message to be confidentiality protected without size limitation. A discovery message may be a message used in a discovery procedure. Discovery messages may contain certain information elements (IEs) (e.g., a metadata IE including a variable length).

Aspects of the present disclosure may include a number of benefits or advantages. For instance, aspects presented herein may provide security protection for different types of messages. Also, aspects presented herein may provide confidentiality protection for discovery messages. Aspects presented herein may provide message-specific confidentiality protection using a ciphering algorithm. Further, aspects presented herein may provide scrambling protection for messages using a scrambling algorithm. Moreover, aspects presented herein may allow an entire discovery message to be confidentiality protected without any limitation, such as a size limitation or an information limitation.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a discovery component 198 that may be configured to transmit, to a network entity prior to obtaining a discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm. The discovery component 198 may also be configured to receive, from the network entity prior to obtaining the discovery message, a discovery response message including ProSe code, where the discovery response message further includes a chosen ciphering algorithm in the list of supported ciphering algorithms associated with the UE. The discovery component 198 may also be configured to obtain, prior to obtaining a discovery message, a mask from a network entity, where the first portion of the discovery message is indicated by the mask. The discovery component 198 may also be configured to obtain, prior to obtaining a discovery message, an indication of the scrambling algorithm and the scrambling key, where the scrambling algorithm is different from the ciphering algorithm and the scrambling key is different from the ciphering key. The discovery component 198 may also be configured to obtain, prior to obtaining a discovery message, an indication of the ciphering algorithm and a security key; and derive a ciphering key based on at least one of the security key or the first set of time parameters. The discovery component 198 may also be configured to obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters. Ciphering may be an encoding or encryption of a message, where the purpose is to encrypt a specified portion of the message. Ciphering may utilize a ciphering key (i.e., a key used to cipher a message) or a ciphering algorithm (i.e., an algorithm used to cipher a message). Deciphering may be the process of un-ciphering or decoding a message. Scrambling may be an encoding or encryption of a message, where the purpose is to encrypt a limited part of a message. Scrambling may utilize a scrambling key (i.e., a key used to scramble a message) or a scrambling algorithm (i.e., an algorithm used to scramble a message). Descrambling may be the process of un-scrambling or decoding a message. In some aspects, the time parameters may be the same as freshness parameters. For instance, time parameters may be used as freshness parameters. For example, freshness parameters may be a counter value maintained between UEs or a coordinated universal time (UTC)-based time counter. The discovery component 198 may also be configured to descramble the discovery message based on at least one of the scrambling key, the scrambling algorithm, or the second set of time parameters. The discovery component 198 may also be configured to decipher the discovery message based on at least one of the ciphering key, the ciphering algorithm, or the first set of time parameters. The discovery component 198 may also be configured to cipher, prior to transmitting a response message, the response message based on at least one of the ciphering key, the ciphering algorithm, or the first set of time parameters; and scramble, after ciphering the response message and prior to transmitting the response message, the response message based on at least one of the scrambling key, the scrambling algorithm, or the second set of time parameters. The discovery component 198 may also be configured to transmit, to a second UE, a response message in response to the discovery message, where the response message is a second discovery message that includes at least response code.

In certain aspects, the base station 102 and/or the core network 120 may have a discovery component 199 that may be configured to receive a first discovery request message including a restricted proximity services (ProSe) application user identifier (RPAUID), where the first discovery request message further includes a sidelink user equipment (UE) security capability representing a first list of supported ciphering algorithms associated with a first UE. The discovery component 199 may also be configured to transmit a first discovery response message including ProSe code, where the first discovery response message further includes a chosen ciphering algorithm in the first list of supported ciphering algorithms associated with the first UE. The discovery component 199 may also be configured to transmit a mask for the first UE, where the first portion of the discovery message is indicated by the mask. The discovery component 199 may also be configured to transmit, for the first UE, an indication of the scrambling algorithm and the scrambling key, where the scrambling algorithm is different from the ciphering algorithm and the scrambling key is different from the ciphering key. The discovery component 199 may also be configured to perform at least one of: (1) a first authorization procedure based on at least one of the first discovery request message or the first discovery response message or (2) a second authorization procedure based on at least one of the second discovery request message or the second discovery response message. The discovery component 199 may also be configured to receive, from a second network entity after transmitting the first discovery response message, a second discovery request message further including a sidelink UE security capability representing a second list of supported ciphering algorithms associated with a second UE. The discovery component 199 may also be configured to transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. Although the following description may be focused on 5G NR, the concepts described herein may be applicable to other similar areas, such as LTE, LTE-A, CDMA, GSM, and other wireless technologies.

Figure 2:
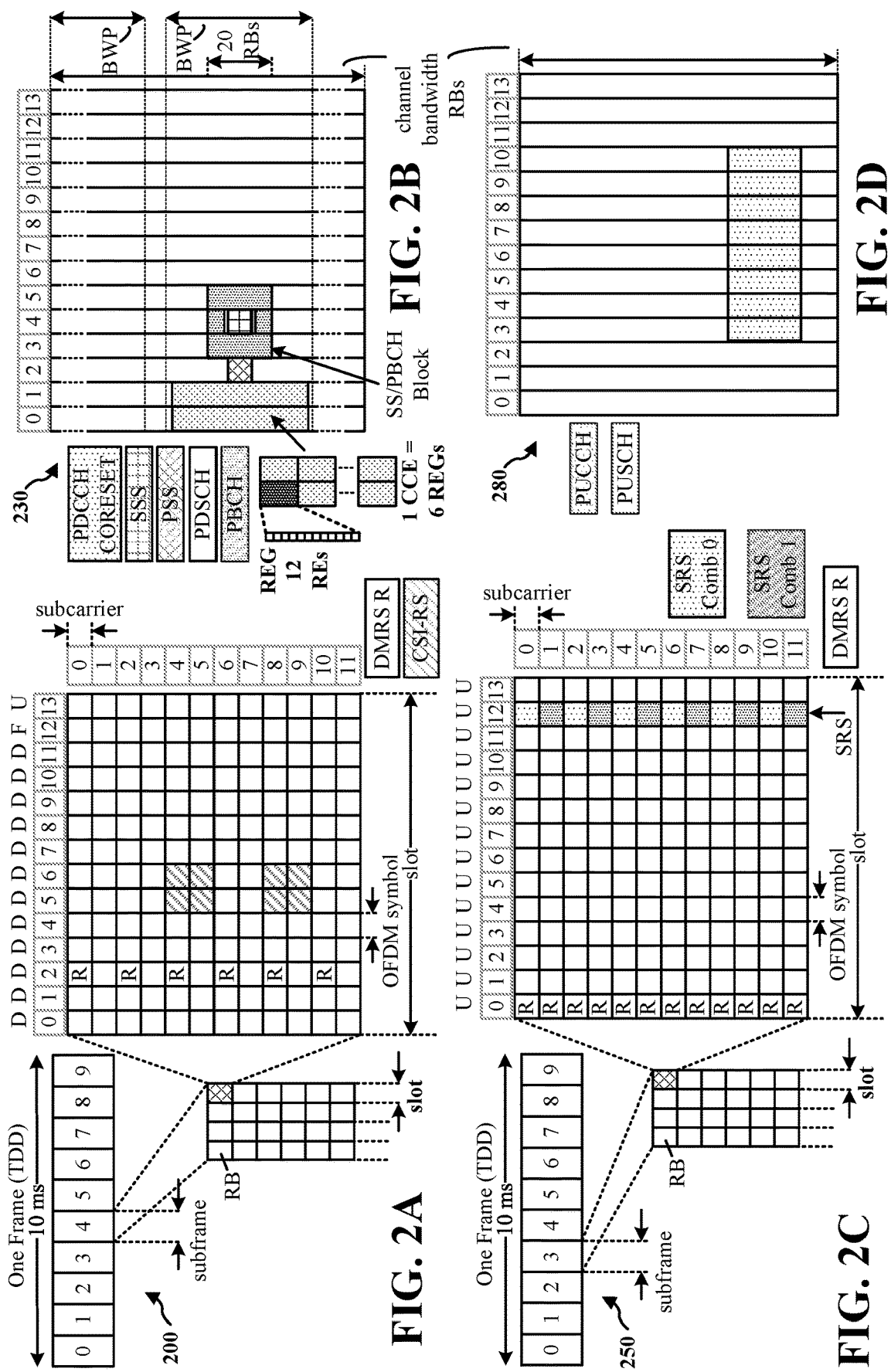
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2μ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the ULE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
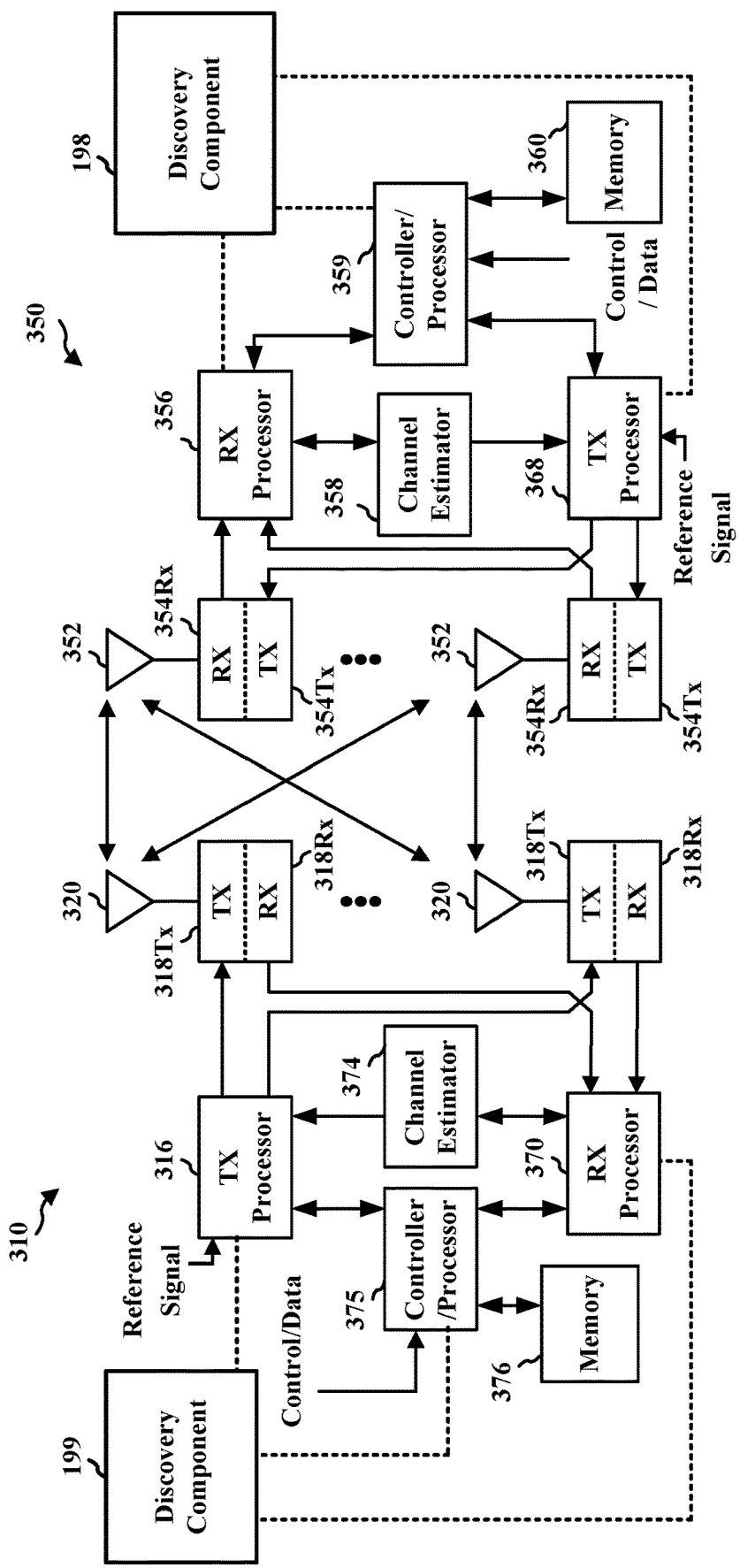
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the ULE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 316, the RX processor 370, and the controller/processor 375 may be configured to perform aspects in connection with the component 199 of FIG. 1.

Aspects of wireless communication may include communication systems that are associated with proximity services (ProSe). ProSe may be device-to-device (D2D) technology that allows devices to detect each other and to communicate directly with one another. For instance, ProSe may enable direct communication between UEs over a sidelink interface (e.g., a PC5 interface). ProSe may also provide discovery and communication capabilities. Direct discovery may be categorized into open discovery or restricted discovery. In open discovery, explicit permission from the UE being discovered may be not used. However, integrity protection and replay protection may be applied. In restricted discovery, explicit permission from the UE being discovered may be used. Also, integrity protection, replay protection, scrambling protection and message specific confidentiality protection may be applied. A UE may be provided with the security parameters from a network entity (e.g., a direct discovery name management function (DDNMF) in a home public land mobile network (HPLMN)). In some aspects of wireless communication, a UE and a network entity may utilize security keys to encrypt information. Additionally, a security key may be utilized to secure transmissions between multiple devices, such as a first device and a second device.

In some wireless communication systems, the protection of the discovery messages over the PC5 interface may follow defined protection mechanisms. For example, the security mechanisms for scrambling protection and message-specific confidentiality protection may have a limitation on the size of discovery messages, as keystreams may rely on the output of a key derivation function (KDF). A keystream may be a stream of characters (e.g., random or pseudorandom characters) that are combined with a message (e.g., a plaintext message) to produce a coded or encrypted message. A KDF may be an algorithm (e.g., a cryptographic algorithm) that derives one or more keys (e.g., secret keys) from a certain value (e.g., a key, a master key, or a password). In some instances, a maximum output bit length of a KDF may be 256 bits. A discovery message may be a message used in a discovery procedure. However, discovery messages may contain a metadata information element (IE) that has a variable length. In addition, discovery messages for group member discovery may contain an application layer group ID, which can be between 2 and 256 bytes in length. Thus, if the size of the message to be protected is greater than 256 bits due to the metadata IE or application layer group ID, such a mechanism for scrambling and message-specific confidentiality protection may not be applied. Aspects presented herein may provide message-specific confidentiality protection using a ciphering algorithm and scrambling protection using a scrambling algorithm. Additionally, aspects presented herein may allow an entire discovery message to be confidentiality protected without any type of limitation (e.g., a size limitation or information limitation).

Figure 4:
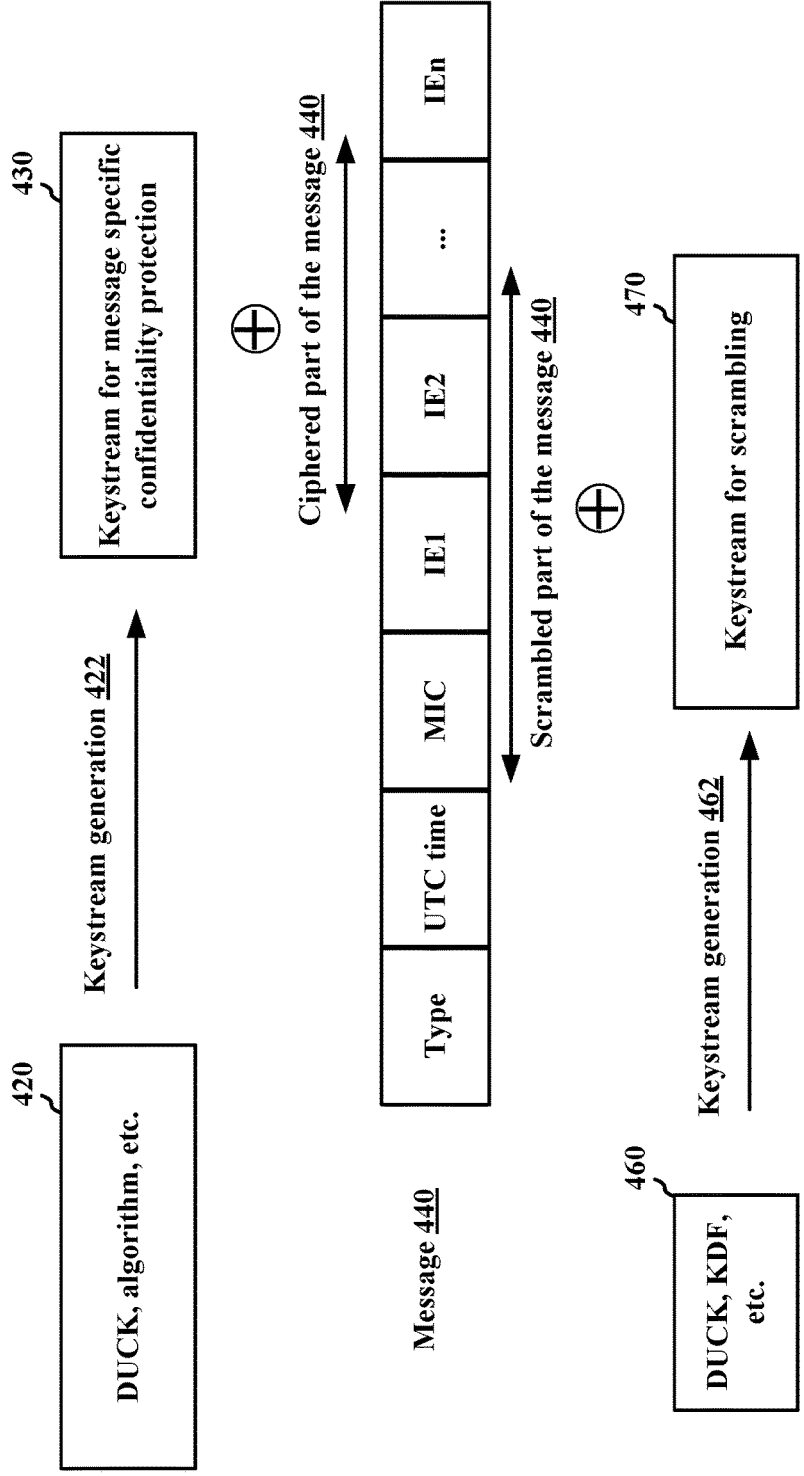
FIG. 4 is a diagram illustrating an example discovery message protection process, in accordance with various aspects of the present disclosure.

FIG. 4 is a diagram 400 illustrating an example discovery message protection process. More specifically, FIG. 4 depicts that scrambling protection may apply up to a certain number of bits (e.g., 256 bits) of a discovery message. As shown in FIG. 4, diagram 400 includes discovery message protection 410 including ciphering algorithm 412, keystream generation 422, message 440, and keystream generation 462. At step 420, a discovery user confidentiality key (DUCK) or ciphering algorithm 412 may undergo a keystream generation 422. The ciphering algorithm 412 may generate a variably-sized keystream that can encrypt an entire message. An encrypted bit mask (Encrypted_bits_mask) may further determine the portion of the message that may need ciphering. Also, at step 430, the keystream may be performed for message specific confidentiality protection. Based on these steps, a ciphered part of the message 440 and a scrambled part of the message 440 may be determined. As shown in FIG. 4, message 440 may include a type, a coordinated universal time (UTC) time, a message integrity check (MIC), and a number of information elements (IEs) (e.g., IE1, IE2, . . . , IEn). A DUCK may be a confidentiality key to apply confidentiality to a specific part of a discovery message. A MIC may be a code to check the integrity of the discovery message. Also, at step 460, the DUCK or KDF may undergo a keystream generation 462, which may result in a keystream for scrambling, at step 470. Further, the KDF may have a fixed/limited output size (e.g., 256 bits), so the message 440 may be scrambled up to the output size of the KDF.

As shown in FIG. 4, because all information to be scrambled may be contained in less than a first number of bits (e.g., 256 bits) of the discovery message, scrambling up to the first number of bits (e.g., 256 bits) of the discovery message may satisfy the purpose of protecting the information. If the discovery message size is larger than 256 bits, the unscrambled part of the message may carry the metadata IE that has been protected using the message-specific confidentiality protection mechanism. The message-specific confidentiality protection may be processed in a variety of ways. In some aspects, in a discovery request procedure, the UE may provide its security capability representing a list of supported ciphering algorithms (e.g., provided to a DDNMF) and may be provisioned with the ciphering algorithm for the message-specific confidentiality protection (e.g., protected by a DDNMF). The keystream for confidentiality protection may be generated using a chosen ciphering algorithm with the following input parameters:

KEY: 128 least significant bits (LSBs) of the output of the KDF (discovery user confidentiality key (DUCK), UTC-based counter, message integrity check (MIC))
COUNT: UTC-based counter
BEARER: 0x00
DIRECTION: 0x00
LENGTH: the length of the discovery message—the length of message type, UTC-based counter LSB and MIC.

KEY may be set to a value in order to generate a message-specific keystream. MIC may be set to a 32-bit random string if a discovery user integrity key (DUIK) is not provisioned. The output keystream of the ciphering algorithm (output_keystream) may be then masked with the encrypted bit mask to produce the final keystream for the message-specific confidentiality protection (KEY-STREAM). In some aspects, KEYSTREAM=output_keystream and (Encrypted_bits_mask || 0xFF . . . FF), where the length of Encrypted_bits_mask may be set to the minimum of: (the length of discovery message—48, 224).

Figure 5:
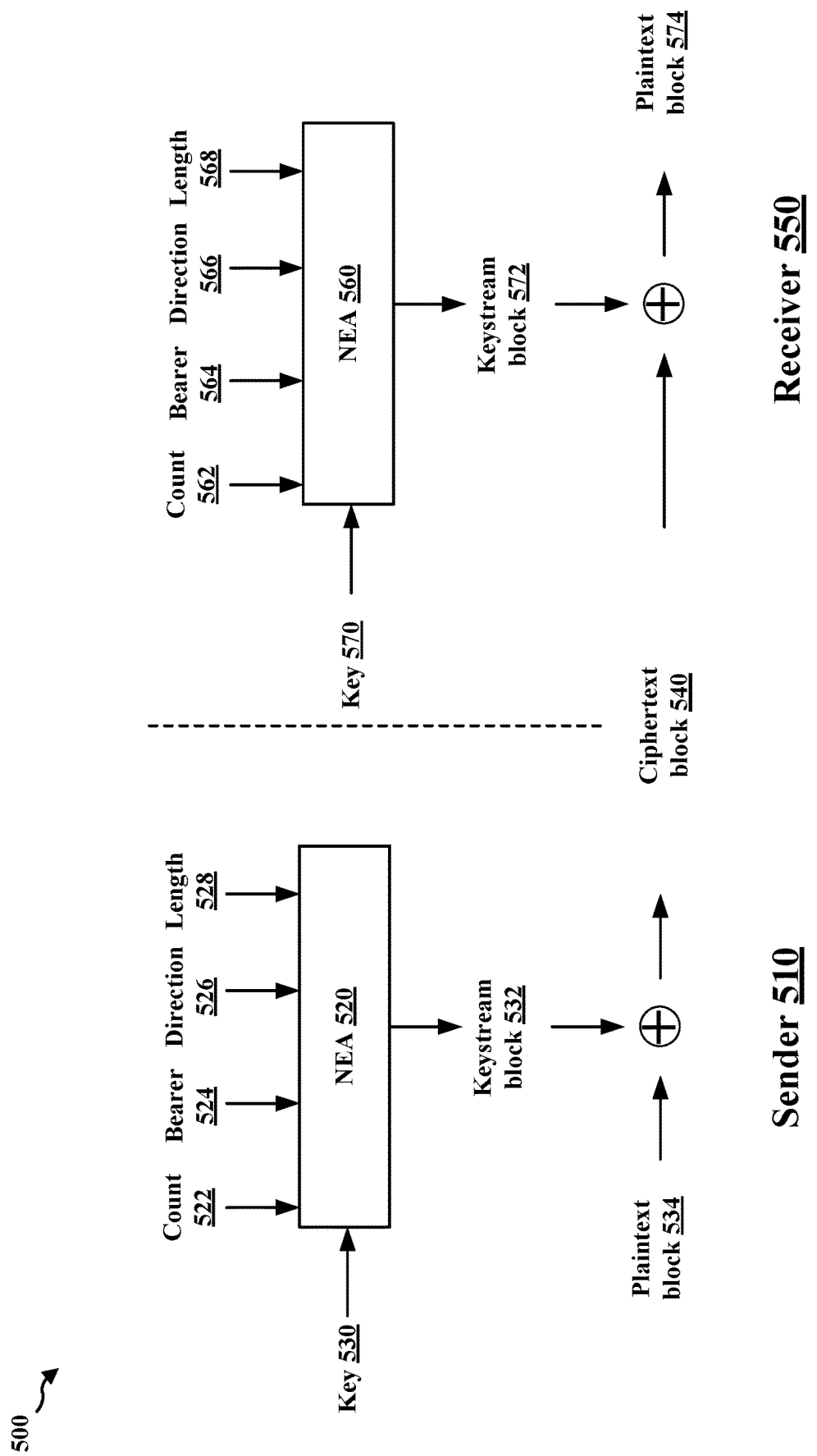
FIG. 5 is a diagram illustrating an example ciphering of data, in accordance with various aspects of the present disclosure.

FIG. 5 is a diagram 500 illustrating an example ciphering of data. More specifically, FIG. 5 depicts ciphering data with the use of an NR encryption algorithm (NEA). As shown in FIG. 5, diagram 500 includes a sender 510 and a receiver 550. The sender 510 includes a number of inputs to NEA 520 (e.g., count 522, bearer 524, direction 526, length 528, and key 530). After NEA 520, the sender 510 combines keystream block 532 with plaintext block 534. This may result in ciphertext block 540. The receiver 550 includes a number of inputs to NEA 560 (e.g., count 562, bearer 564, direction 566, length 568, and key 570). After NEA 560, the receiver 550 combines keystream block 572 with ciphertext block 540. This may result in plaintext block 574.

Additionally, the security for both models of a restricted discovery security procedure (a Model A restricted discovery security procedure and a Model B restricted discovery security procedure) may be similar to that of open discovery. Both models may also use a time-based counter (e.g., a coordinated universal time (UTC)-based counter) to provide freshness for the protection of the restricted discovery message on the PC5 interface. Some parameters (e.g., a current time parameter (CURRENT_TIME) and a maximum offset parameter (MAX_OFFSET)) may also be provided to the UE from the DDNMF in its HPLMN to ensure that the obtained UTC-based counter is sufficiently close to real-time in order to protect against replays. In some aspects, the restricted discovery may use confidentiality protection of the discovery messages (e.g., to ensure a UE is not discovered by unauthorized parties or tracked due to constantly sending the same ProSe restricted/response Code in the clear) and that the MIC checking may be performed by the receiving UE (if allowed by the DDNMF).

The security parameters used by a transmitting UE (i.e., the announcing UE in Model A discovery, and the discoverer UE sending the ProSe query code and the discoveree UE sending the ProSe response code in in Model B discovery) to protect a discovery message may be provided in the code-sending security parameters. Similarly, the security parameters utilized by a UE receiving a discovery message (i.e., the monitoring UE in Model A discovery, and the discoverer UE receiving a ProSe response code and the discoveree UE receiving a ProSe query code in Model B discovery) may be provided in the code-receiving security parameters. During the discovery request procedure, a DDNMF may provide the PC5 security policies to the UEs. A ciphering algorithm for message-specific confidentiality may be configured at the UE during the discovery request procedure.

Figure 6:
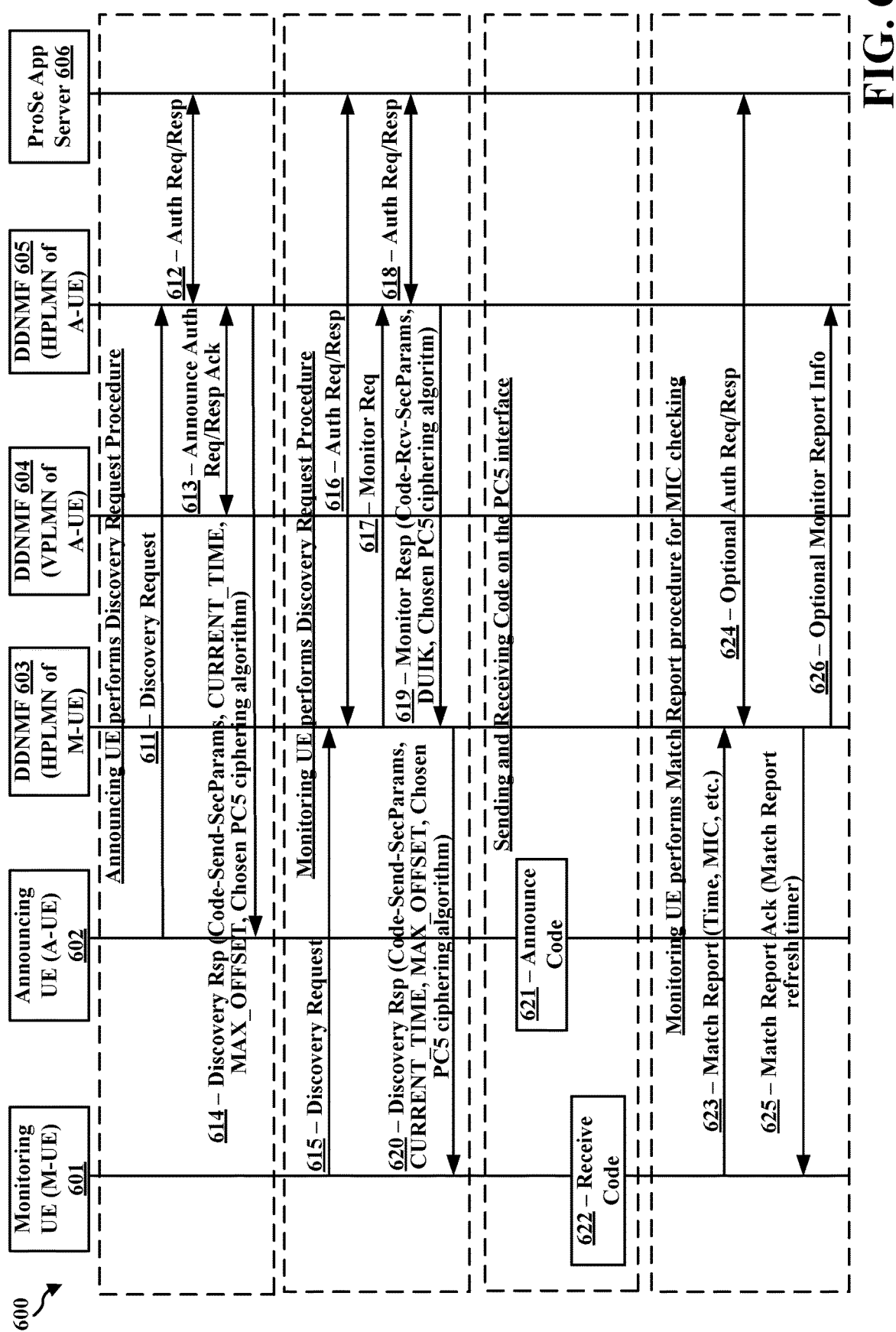
FIG. 6 is a diagram illustrating an example restricted discovery security procedure, in accordance with various aspects of the present disclosure.

FIG. 6 is a diagram 600 illustrating an example restricted discovery security procedure. More specifically, FIG. 6 depicts an example Model A restricted discovery security procedure. In a Model A restricted discovery security procedure, an announcing UE may broadcast information about itself in a discovery message. For instance, in a Model A restricted discovery security procedure, an announcing UE may correspond to a transmitting UE and a monitoring UE may correspond to a receiving UE. As shown in FIG. 6, diagram 600 includes a monitoring UE 601, an announcing UE 602, a DDNMF 603 (e.g., a DDNMF in a HPLMN of the monitoring UE), a DDNMF 604 (e.g., a DDNMF in a visiting public land mobile network (VPLMN) of the announcing UE), DDNMF 605 (e.g., a DDNMF in a HPLMN of the announcing UE), and a ProSe application server 606.

At 611, the announcing UE 602 may send a discovery request to the DDNMF 605 (e.g., a DDNMF in a HPLMN of the announcing UE). At 612, the DDNMF 605 may perform an authorization procedure with the ProSe application server 606 (e.g., exchange an authorization (Auth) request and an Auth response). At 613, the DDNMF 605 may perform an authorization procedure with the DDNMF 604 (e.g., exchange announce authorization (Auth) for the discovery request acknowledgment (ACK) and discovery response ACK). At 614, the DDNMF 605 may send a discovery response to the announcing UE 602. The discovery response may include a set of code-sending security parameters (Code-Send-SecParams), a current time parameter (CURRENT_TIME), a maximum offset parameter (MAX_OFFSET), and/or a chosen PC5 ciphering algorithm.

As shown in FIG. 6, steps 611-614 refer to the announcing UE 602 performing the discovery request procedure. At steps 611-614, the announcing UE may send a discovery request message containing a restricted ProSe application user identifier (RPAUID) to the DDNMF in the announcing UE's HPLMN in order to obtain the ProSe code to announce and to obtain the associated security material. ProSe code may be code or information that is associated with ProSe applications for discovery. In addition, the announcing UE may include its PC5 UE security capability that contains a list of supported ciphering algorithms in the discovery request message. The DDNMF may check for the announce authorization with the ProSe application server 606. If the announcing UE is roaming, the DDNMFs in the HPLMN and visiting PLMN (VPLMN) of the announcing UE may exchange an announce authorization (Auth) request and respond. The DDNMF in the HPLMN of the announcing UE may return the ProSe code and the corresponding code-sending security parameters, along with the CURRENT_TIME and MAX_OFFSET parameters. The code-sending security parameters may provide the information for the announcing UE to protect the transmission of the ProSe Code and may be stored with the ProSe code. The DDNMF in the HPLMN of the announcing UE may include the chosen PC5 ciphering algorithm in the discovery response message. A discovery response message may be a message sent in response to a discovery message. In addition, the DDNMF in the HPLMN of the announcing UE may include the PC5 security policies in the discovery response message. DDNMF may obtain the PC5 security policies in different manners (e.g., from a policy control function (PCF), from the ProSe application server, or based on a local configuration).

At 615, the monitoring UE 601 may send a discovery request to the DDNMF 603 (e.g., a DDNMF in a HPLMN of the monitoring UE). At 616, the DDNMF 603 may perform an authorization procedure with the ProSe application server 606 (e.g., exchange an authorization (Auth) request and an Auth response). At 617, the DDNMF 603 may send a monitoring request to the DDNMF 605. At 618, the DDNMF 605 may perform an authorization procedure with the ProSe application server 606 (e.g., exchange announce authorization (Auth) request and response). At 619, the DDNMF 605 may send a monitoring response message to the DDNMF 603. The monitoring response may include a set of code-receiving security parameters (Code-Rcv-SecParams), a discovery user integrity key (DUIK), and/or a chosen PC5 ciphering algorithm. At 620, the DDNMF 603 may send a discovery response to the monitoring UE 601. The discovery response may include a set of code-sending security parameters (Code-Send-SecParams), a current time (CURRENT_TIME) parameter, a maximum offset (MAX_OFFSET) parameter, and/or a chosen PC5 ciphering algorithm.

As depicted in FIG. 6, steps 615-620 may refer to the monitoring UE 601 performing the discovery request procedure. At steps 615-620, the monitoring UE may send a discovery request message containing the RPAUID and PC5 UE security capability to the DDNMF in the monitoring UE's HPLMN in order to be allowed to monitor for one or more restricted ProSe application user IDs. The DDNMF in the HPLMN of the monitoring UE may send an authorization request to the ProSe application server. If, based on the permission settings, the RPAUID is allowed to discover at least one of the target RPAUIDs contained in the application level container, the ProSe application server 606 may return an authorization response. If the discovery request is authorized, and the PLMN ID in the target RPAUID indicates a different PLMN, the DDNMF in the HPLMN of the monitoring UE may contact the indicated PLMN's DDNMF (i.e., the DDNMF in the HPLMN of the announcing UE), by sending a monitor request message. Also, the DDNMF in the HPLMN of the monitoring UE may exchange authorization messages with the ProSe Application Server. The DDNMF in the HPLMN of the announcing UE may respond to the DDNMF in the HPLMN of the monitoring UE with a monitor response message including the ProSe code, the corresponding code-receiving security parameters, a discovery user integrity key (DUIK), and a chosen PC5 ciphering algorithm. The code-receiving security parameters may provide the information that may be used by the monitoring UE to undo the protection applied by the announcing UE. The DUIK may be included as a separate parameter if the code-receiving security parameters indicate that the monitoring UE uses match reports for MIC checking. The DDNMF in the HPLMN of the monitoring UE may store the ProSe code and the DUIK (e.g., the DDNMF may store the DUIK if it received outside of the code-receiving security parameters). The DDNMF in the HPLMN of the announcing UE may send the PC5 security policies to the DDNMF in the HPLMN of the monitoring UE. In some aspects, there may be two configurations possible for integrity checking: (1) the MIC checked by the DDNMF, and (2) the MIC checked at the UE side. The configuration that is used may be decided by the DDNMF that assigned the ProSe code being monitored, and signaled to the monitoring UE in the code-receiving security parameters. The DDNMF 603 in the HPLMN of the monitoring UE may return the discovery filter and the code-receiving security parameters, along with the CURRENT_TIME and MAX_OFFSET parameters and the chosen PC5 ciphering algorithm. The monitoring UE 601 may take the same actions with the CURRENT_TIME and MAX_OFFSET parameters, as described for the monitoring UE. Also, the monitoring UE may store the discovery filter, the code-receiving security parameters, and the chosen PC5 ciphering algorithm. If the DDNMF 603 in the HPLMN of the monitoring UE receives the PC5 security policies, the monitoring UE's DDNMF may forward the PC5 security policies to the monitoring UE.

As illustrated in FIG. 6, steps 621-622 may refer to sending and receiving code on the PC5 interface. At 621, the announcing UE 602 may announce the code (e.g., ProSe code). At 622, after the announcement of the code, the monitoring UE 601 may receive the code (e.g., ProSe code).

As further depicted in FIG. 6, steps 623-626 may refer to the monitoring UE 601 performing a match report procedure for MIC checking. At 623, the monitoring UE 601 may send the match report to the DDNMF 603. The match report may include a time parameter, the MIC, etc. At 624, the DDNMF 603 may perform an authorization procedure (e.g., an optional authorization procedure) with the ProSe application server 606 (e.g., exchange an authorization (Auth) request and an Auth response). At 625, the DDNMF 603 may send a match report ACK to the monitoring UE 601. The match report ACK may include a match report refresh timer. Further, at 626, the DDNMF 603 may send monitoring report information (i.e., optional monitoring report information) to the DDNMF 605.

Figure 7:
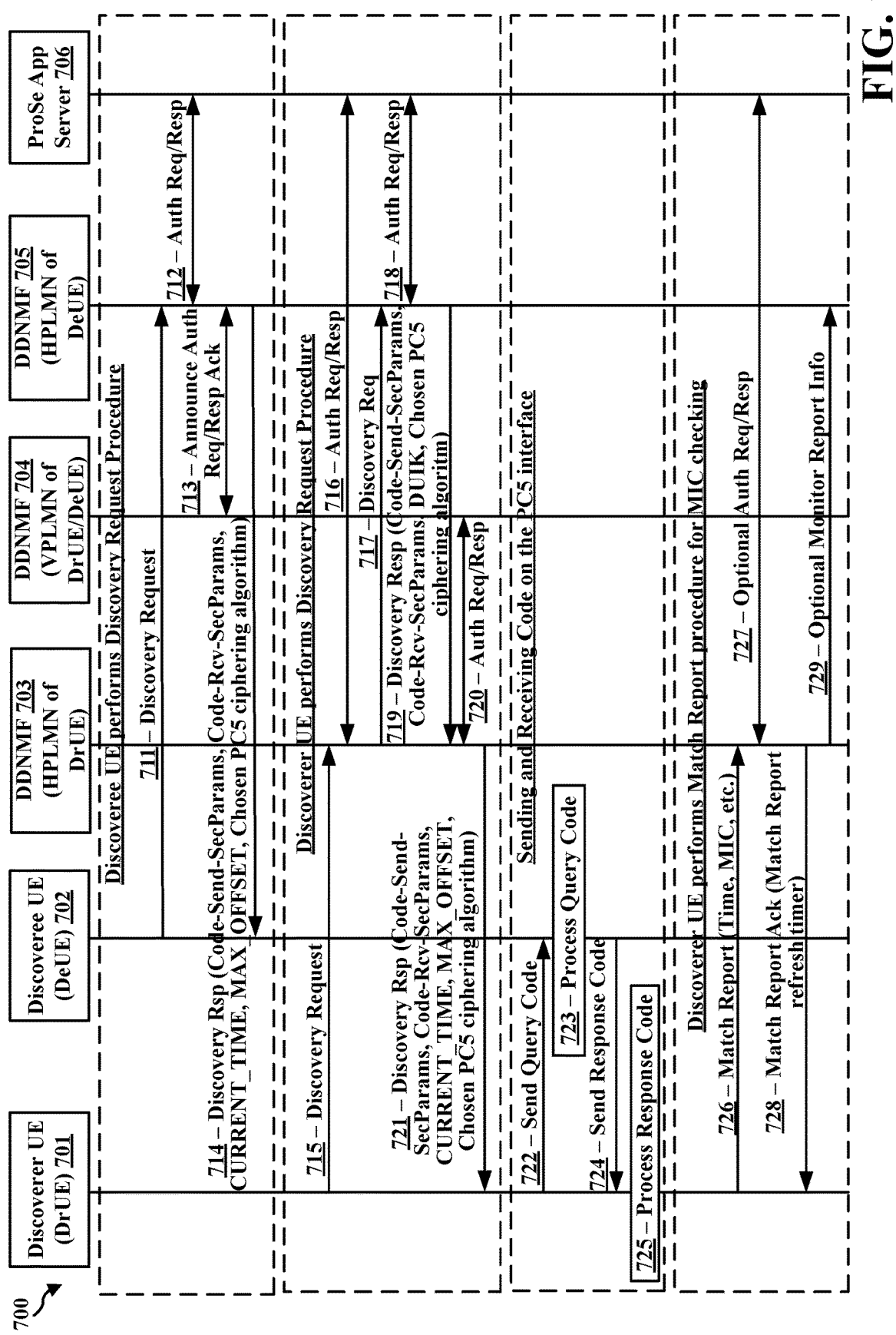
FIG. 7 is a diagram illustrating an example restricted discovery security procedure, in accordance with various aspects of the present disclosure.

FIG. 7 is a diagram 700 illustrating an example restricted discovery security procedure. More specifically, FIG. 7 depicts an example Model B restricted discovery security procedure. In a Model B restricted discovery security procedure, a discoverer UE may transmit a request containing certain information about what it may be interested to discover, and a discoveree UE may receive the request message and may respond with some information related to the request. For instance, in a Model B restricted discovery security procedure, a discoveree UE may correspond to a transmitting UE and a discoverer UE may correspond to a receiving UE. As shown in FIG. 7, diagram 700 includes a discoverer UE 701, a discoveree UE 702, a DDNMF 703 (e.g., a DDNMF in a HPLMN of the discoverer UE), a DDNMF 704 (e.g., a DDNMF in a visiting public land mobile network (VPLMN) of the discoverer UE/discoveree UE), DDNMF 705 (e.g., a DDNMF in a HPLMN of the discoveree UE), and a ProSe application server 706.

At 711, the discoveree UE 702 may send a discovery request to the DDNMF 705 (e.g., a DDNMF in a HPLMN of the discoveree UE). At 712, the DDNMF 705 may perform an authorization procedure with the ProSe application server 706 (e.g., exchange an authorization (Auth) request and an Auth response). At 713, the DDNMF 705 may perform an authorization procedure with the DDNMF 704 (e.g., exchange an announce authorization (Auth) request acknowledgment (ACK) and an announce Auth response ACK). At 714, the DDNMF 705 may send a discovery response to the discoveree UE 702. The discovery response may include a set of code-sending security parameters (Code-Send-SecParams), a set of code-receiving security parameters (Code-Rcv-SecParams), a current time parameter (CURRENT_TIME), a maximum offset parameter (MAX_OFFSET), and/or a chosen PC5 ciphering algorithm.

As depicted in FIG. 7, steps 711-714 refer to the discoveree UE 702 performing the discovery request procedure. The discoveree UE may send a discovery request message containing the RPAUID to the DDNMF in the discoveree UE's HPLMN in order to obtain a discovery query filter(s) to monitor a query, the ProSe response code to announce, and associated security materials. The command may indicate that this is for a ProSe response (Model B) operation (i.e., for a discoveree UE). In addition, the discoveree UE may include its PC5 UE security capability that contains the list of supported ciphering algorithms by the UE in the discovery request message. The DDNMF may check for the announce authorization with the ProSe application server (depending on the DDNMF configuration). Also, the DDNMFs in the HPLMN and VPLMN of the discoveree UE may exchange announce authorization (Auth) messages. If the discoveree UE is not roaming, the announce Auth messages may not be exchanged. The DDNMF in the HPLMN of the discoveree UE may return the ProSe response code and the code-sending security parameters, discovery query filter(s), code-receiving security parameters corresponding to each discovery filter, along with the CURRENT_TIME and MAX_OFFSET parameters and the chosen PC5 ciphering algorithm. The code-sending security parameters may provide the information for the discoveree UE to protect the transmission of the ProSe response code and may be stored with the ProSe response code. The code-receiving security parameters may provide the information utilized by the discoveree UE to undo the protection applied to the ProSe query code by the discoverer UE. The code-receiving security parameters may indicate a match report will not be used for MIC checking. The UE may store each discovery filter with its associated code-receiving security parameters. The discoveree UE may take actions with the CURRENT_TIME and MAX_OFFSET parameters. The DDNMF in the HPLMN of the discoveree UE may include the chosen PC5 ciphering algorithm in the discovery response message. In addition, the DDNMF in the HPLMN of the discoveree UE may include the PC5 security policies in the discovery response message. DDNMF may obtain the PC5 security policies in different manners (e.g., from a PCF, from a ProSe application server, or based on local configuration).

At 715, the discoverer UE 701 may send a discovery request to the DDNMF 703 (e.g., a DDNMF in a HPLMN of the discoverer UE). At 716, the DDNMF 703 may perform an authorization procedure with the ProSe application server 706 (e.g., exchange an authorization (Auth) request and response). At 717, the DDNMF 703 may send a discovery request to the DDNMF 705. At 718, the DDNMF 705 may perform an authorization procedure with the ProSe application server 706 (e.g., exchange announce authorization (Auth) request and response). At 719, the DDNMF 705 may send a discovery response message to the DDNMF 703. The discovery response may include a set of code-sending security parameters (Code-Send-SecParams), a set of code-receiving security parameters (Code-Rcv-SecParams), a discovery user integrity key (DUIK), and/or a chosen PC5 ciphering algorithm. At 720, the DDNMF 703 may perform an authorization procedure with the DDNMF 704 (e.g., exchange an announce authorization (Auth) request and an announce Auth response). At 721, the DDNMF 703 may send a discovery response to the discoverer UE 701. The discovery response may include a set of code-sending security parameters (Code-Send-SecParams), a set of code-receiving security parameters (Code-Rcv-SecParams), a current time parameter (CURRENT_TIME), a maximum offset parameter (MAX_OFFSET), and/or a chosen PC5 ciphering algorithm.

As depicted in FIG. 7, steps 715-721 refer to the discoverer UE 701 performing the discovery request procedure. At steps 715-721, the discoverer UE 701 may send a discovery request message containing the RPAUID and the PC5 UE security capability to the DDNMF 703 in the discoverer UE's HPLMN in order to be allowed to discover one or more restricted ProSe application user IDs. The DDNMF 703 in the HPLMN of the discoverer UE may send an authorization request to the ProSe application server 706. If the RPAUID is allowed to discover at least one of the target RPAUIDs contained in the application level container, the ProSe application server 706 may return an authorization response. In some aspects, if the discovery request is authorized, and the PLMN ID in the target RPAUID indicates a different PLMN, the DDNMF in the HPLMN of the discoverer UE may contact the indicated PLMN's DDNMF (i.e., the DDNMF in the HPLMN of the discoveree UE) by sending a discovery request message. The DDNMF 705 in the HPLMN of the discoveree UE may exchange authorization messages with the ProSe application server 706. The DDNMF 705 in the HPLMN of the discoveree UE may respond to the DDNMF 703 in the HPLMN of the discoverer UE with a discovery response message that may include the ProSe query code(s) and the associated code-sending security parameters, ProSe response code and its associated code-receiving security parameters, a discovery user integrity key (DUIK) for the ProSe response code, and a chosen PC5 ciphering algorithm. The code-receiving security parameters may provide the information used by the discoverer UE 701 to undo the protection applied by the discoveree UE 702. The DUIK may be included as a separate parameter if the code-receiving security parameters indicate that the discoverer UE uses match reports for MIC checking. The DDNMF 703 in the HPLMN of the discoverer UE may store the ProSe response code and the discovery user integrity key (if it is received outside of the code-receiving security parameters). The code-sending security parameters may provide the information utilized by the discoverer UE to protect the ProSe query code. The DDNMF 705 in the HPLMN of the discoveree UE may send the PC5 security policies to the DDNMF 703 in the HPLMN of the discoverer UE. In some aspects, there may be two configurations possible for integrity checking: (1) a MIC checked by the DDNMF, and (2) a MIC checked at the UE side. The configuration may be decided by the DDNMF that assigned the ProSe code being monitored, and signalled to the discoverer UE in the code-receiving security parameters. The DDNMF 703 in the HPLMN of the discoverer UE and the DDNMF 704 in the VPLMN of the discoverer UE may exchange Announce Auth messages. If the discoverer UE is not roaming, the Announce Auth messages may not be exchanged. The DDNMF 703 in the HPLMN of the discoverer UE may return the discovery response filter and the code-receiving security parameters, the ProSe query code, the code-sending security parameters along with the CURRENT_TIME and MAX_OFFSET parameters and the chosen PC5 ciphering algorithm. The discoverer UE 701 may take the same actions with CURRENT_TIME and MAX_OFFSET. The discoverer UE may also store the discovery response filter and its code-receiving security parameters and the ProSe query code and its code-sending security parameters, and the chosen PC5 ciphering algorithm. If the DDNMF 703 in the HPLMN of the discoverer UE receives the PC5 security policies, the discoverer UE's DDNMF may forward the PC5 security policies to the discoverer UE 701.

As illustrated in FIG. 7, steps 722-725 may refer to sending and receiving code on the PC5 interface. At 722, the discoverer UE 701 may send query code to the discoveree UE 702. At 723, the discoveree UE 702 may process the query code. Query code may be code or information that queries a response. At 724, the discoveree UE 702 may send response code to the discoverer UE 701. At 725, the discoverer UE 701 may process the response code. Response code may be code or information that is transmitted in response to a query.

As further depicted in FIG. 7, steps 726-729 may refer to the discoverer UE 701 performing a match report procedure for MIC checking. At 726, the discoverer UE 701 may send the match report to the DDNMF 703. The match report may include a set of time parameters, the MIC, etc. In some aspects, the time parameters may be the same as freshness parameters. For instance, time parameters may be used as freshness parameters. For example, freshness parameters may be a counter value maintained between UEs or a UTC-based time-based counter. At 727, the DDNMF 703 may perform an authorization procedure (e.g., optional authorization procedure) with the ProSe application server 706 (e.g., exchange an authorization (Auth) request and an Auth response). At 728, the DDNMF 703 may send a match report ACK to the discoverer UE 701. The match report ACK may include a match report refresh timer. At 729, the DDNMF 703 may send monitoring report information (i.e., optional monitoring report information) to the DDNMF 705.

In some aspects, there may be three types of security that are used to protect the restricted discovery messages over the PC5 interface: integrity protection, scrambling protection, and message-specific confidentiality. In some aspects, the protection mechanisms may be as follows. Message-specific confidentiality protection may be provided by ProSe layer between ProSe UEs. The use and mode of operation of the 128-NR encryption algorithms (NEA) algorithms may be based on a configuration. The input parameters to the 128-NEA algorithms may be:

KEY: 128 least significant bits (LSBs) of output of KDF (DUSK, UTC-based counter, MIC)
COUNT: UTC-based counter
BEARER: 0x00
DIRECTION: 0x00
LENGTH: the length of the discovery message—the length of message type, UTC-based counter LSB and MIC.

KEY may be set to a value in order to generate a message-specific keystream. The output keystream of the ciphering algorithm (output_keystream) may then be masked with the encrypted bit mask to produce the final keystream for the message-specific confidentiality protection (KEYSTREAM). In some aspects, KEYSTREAM=output_keystream and (Encrypted_bits_mask || 0xFF . . . FF), where the length of Encrypted_bits_mask is set to a minimum of: (the length of discovery message—48, 224). The KEYSTREAM may be XOR'ed with the discovery message for message-specific confidentiality protection. The time-hash-bitsequence keystream may be set to L least significant bits of the output of the KDF, where L is the bit length of the discovery message to be scrambled and set to a minimum of: (the length of discovery message—16, 256). MIC may be set to a 32-bit random string if DUIK is not provisioned. The maximum length of the discovery message to be scrambled may be limited to 256 bits.

128-NEA algorithms may include 128-NEA1, 128-NEA2, and 128-NEA3. 128-NEA1 may based on a certain algorithm (e.g., a SNOW 3G algorithm). 128-NEA2 may be based on an advances encryption standard (AES) (e.g., a 128-bit AES). 128-NEA3 may be based on a certain algorithm (e.g., a ZUC algorithm). In some aspects, a time-hash-bitsequence may be replaced by a scrambling-keystream. Also, a scrambling key may be a discovery user scrambling key (DUSK). For instance, a DUSK may be a scrambling key to apply scrambling protection to a part of discovery message. The scrambling-keystream may be the KEYSTREAM block computed by the chosen ciphering algorithm with at least the following inputs:

KEY: 128 least significant bits (LSBs) of output of KDF (DUSK,
UTC-based counter, MIC)
COUNT: UTC-based counter
BEARER: 0x00
DIRECTION: 0x00
LENGTH: the length of the discovery message—the length of message type, and UTC-based counter LSB.

In some aspects, the discovery message to be ciphered and/or scrambled may be less than a defined size (e.g., 256 bits) by replacing the application layer group identifier (ID) with an application layer group ID code. An application layer group ID may be a group ID for an application layer. Application layer group ID code may be code that corresponds to the application layer group ID. In some aspects, the application layer group ID code representing the application layer group ID may be a hash of the application layer group ID. Ciphering may be an encoding or encryption of a message, where the purpose is to encrypt a specified portion of the message. Ciphering may utilize a ciphering key (i.e., a key used to cipher a message) or a ciphering algorithm (i.e., an algorithm used to cipher a message). Deciphering may be the process of un-ciphering or decoding a message. Scrambling may be an encoding or encryption of a message, where the purpose is to encrypt a limited part of a message. Scrambling may utilize a scrambling key (i.e., a key used to scramble a message) or a scrambling algorithm (i.e., an algorithm used to scramble a message). Descrambling may be the process of un-scrambling or decoding a message.

Aspects of the present disclosure may include a number of benefits or advantages. For instance, aspects presented herein may provide security protection for different types of messages. Also, aspects presented herein may provide confidentiality protection for discovery messages. Aspects presented herein may provide message-specific confidentiality protection using a ciphering algorithm. Further, aspects presented herein may provide scrambling protection for messages using a scrambling algorithm. Moreover, aspects presented herein may allow an entire discovery message to be confidentiality protected without any limitation, such as a size limitation or an information limitation.

Figure 8:
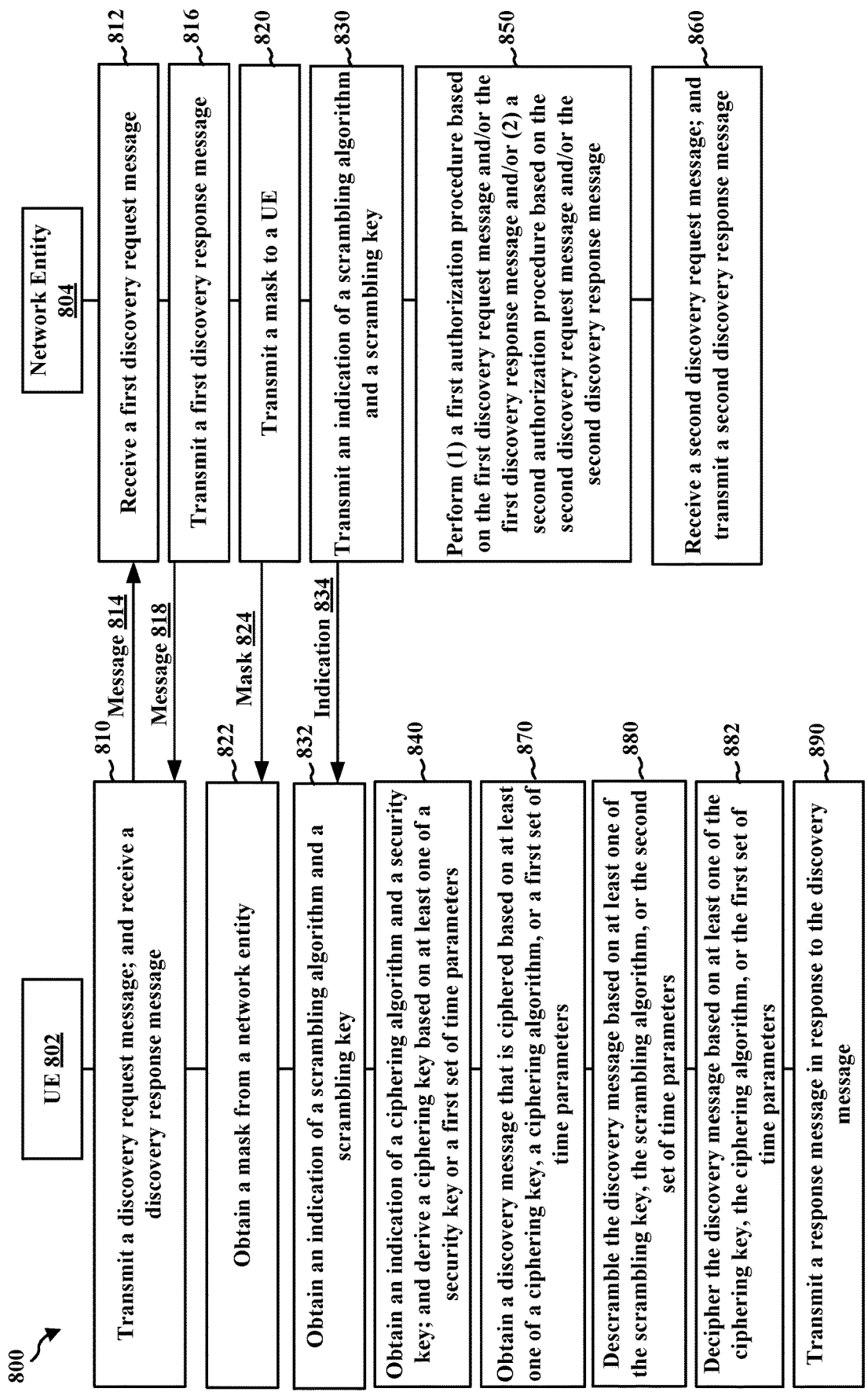
FIG. 8 is a communication flow diagram illustrating example communications between a UE and a network entity, in accordance with various aspects of the present disclosure.

FIG. 8 is a communication flow diagram 800 of wireless communication in accordance with one or more techniques of this disclosure. As shown in FIG. 8, diagram 800 includes example communications between UE 802 and network entity 804, in accordance with one or more techniques of this disclosure. In some aspects, UE 802 may be a first wireless device and network entity 804 may be a second wireless device. The UE 802 may correspond to the monitoring UE 601 or the announcing UE 602 in FIG. 6 and/or the discoverer UE 701 or the discoveree UE 702 in FIG. 7.

At 810, UE 802 may transmit, to a network entity prior to obtaining a discovery message, a discovery request message including a restricted proximity services (ProSe) application user identifier (RPAUID) associated with the UE (e.g., UE 802 may transmit message 814 to network entity 804), where the discovery request message further includes a sidelink UE security capability representing a list of supported ciphering algorithms including the ciphering algorithm.

Also, at 810, UE 802 may receive, from the network entity prior to obtaining the discovery message, a discovery response message including ProSe code (e.g., UE 802 may receive message 818 from network entity 804), where the discovery response message further includes a chosen ciphering algorithm in the list of supported ciphering algorithms associated with the UE. The discovery response message may further include at least one of a first set of security parameters, a second set of security parameters, a current time value, or a maximum time offset value.

At 812, network entity 804 may receive a first discovery request message including a restricted proximity services (ProSe) application user identifier (RPAUID) (e.g., network entity 804 may receive message 814 from UE 802), where the first discovery request message further includes a sidelink user equipment (UE) security capability representing a first list of supported ciphering algorithms associated with a first UE. In some aspects, to receive the first discovery request message, the network entity may receive, via at least one of a transceiver or an antenna, the first discovery request message.

At 816, network entity 804 may transmit a first discovery response message including ProSe code (e.g., network entity 804 may transmit message 818 to UE 802), where the first discovery response message further includes a chosen ciphering algorithm in the first list of supported ciphering algorithms associated with the first UE.

At 820, network entity 804 may transmit a mask for the first UE (e.g., network entity 804 may transmit mask 824 to UE 802), where the first portion of the discovery message is indicated by the mask.

At 822, UE 802 may obtain, prior to obtaining a discovery message, a mask from a network entity (e.g., UE 802 may receive mask 824 from network entity 804), where the first portion of the discovery message is indicated by the mask.

At 830, network entity 804 may transmit, for the first UE, an indication of the scrambling algorithm and the scrambling key e.g., network entity 804 may transmit indication 834 to UE 802), where the scrambling algorithm is different from the ciphering algorithm and the scrambling key is different from the ciphering key.

At 832, UE 802 may obtain, prior to obtaining a discovery message, an indication of the scrambling algorithm and the scrambling key e.g., UE 802 may receive indication 834 from network entity 804), where the scrambling algorithm is different from the ciphering algorithm and the scrambling key is different from the ciphering key. In some aspects, to obtain the indication of the scrambling algorithm and the scrambling key, the UE may receive, from a network entity, the indication of the scrambling algorithm and the scrambling key. Accordingly, the UE may receive, from a network entity, the indication of the scrambling algorithm and the scrambling key. Also, the network entity may be a direct discovery name management function (DDNMF) in a home public land mobile network (HPLMN). The scrambling key may be a discovery user scrambling key (DUSK). A DUSK may be a scrambling key for a user in a discovery procedure.

At 840, UE 802 may obtain, prior to obtaining a discovery message, an indication of the ciphering algorithm and a security key; and derive a ciphering key based on at least one of the security key or the first set of time parameters. In some aspects, to obtain the indication of the ciphering algorithm and the security key, the UE may receive, from a network entity, the indication of the ciphering algorithm and the security key. The UE may also retrieve an indication of the ciphering algorithm and the security key from a memory or a database. For example, the UE may download the ciphering algorithm and the security key from a database. As indicated above, a UE and a network entity may utilize security keys to encrypt information. Additionally, a security key may be utilized to secure transmissions between multiple devices, such as a first device and a second device. Also, the network entity may be a direct discovery name management function (DDNMF) in a home public land mobile network (HPLMN). Further, the ciphering key may be based on a discovery user confidentiality key (DUCK), the first set of time parameters, or a message-specific parameter, and the message-specific parameter may be a message integrity check (MIC) or a random string.

At 850, network entity 804 may perform at least one of: (1) a first authorization procedure based on at least one of the first discovery request message or the first discovery response message or (2) a second authorization procedure based on at least one of the second discovery request message or the second discovery response message.

At 860, network entity 804 may receive, from a second network entity after transmitting the first discovery response message, a second discovery request message further including a sidelink UE security capability representing a second list of supported ciphering algorithms associated with a second UE.

Also, at 860, network entity 804 may transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. The first discovery response message may further include at least one of a first set of security parameters, a second set of security parameters, a current time value, or a maximum time offset value, and the second discovery response message may further include at least one of the first set of security parameters, the second set of security parameters, the current time value, or the maximum time offset value.

At 870, UE 802 may obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters. In some aspects, a first portion of the discovery message may be ciphered based on the ciphering key, the ciphering algorithm, or the first set of time parameters. A second portion of the discovery message may be scrambled based on the scrambling key, the scrambling algorithm, or the second set of time parameters, where the second portion may be different from the first portion. Also, the second portion may overlap with the first portion, where a size of the second portion may be less than or equal to a size of a key derivation function associated with scrambling key. Moreover, a third portion of the discovery message may not be scrambled, where the third portion may be different from the first portion and the second portion. The discovery message may be less than a defined size, and the discovery message may include an application layer group identifier (ID) code representing an application layer group ID, where the application layer group ID code may be a hash of the application layer group ID. Additionally, the first set of time parameters may include a counter that is associated with a first time instance, and the second set of time parameters may include the counter that is associated with a second time instance. Also, the first set of time parameters may be a first set of freshness parameters and the second set of time parameters may be a second set of freshness parameters, and the counter may be a coordinated universal time (UTC)-based counter. Further, to obtain the discovery message, the UE may receive, via at least one of a transceiver or an antenna, the discovery message from a second UE.

At 880, UE 802 may descramble the discovery message based on at least one of the scrambling key, the scrambling algorithm, or the second set of time parameters.

At 882, UE 802 may decipher the discovery message based on at least one of the ciphering key, the ciphering algorithm, or the first set of time parameters.

Additionally, UE 802 may cipher, prior to transmitting a response message, the response message based on at least one of the ciphering key, the ciphering algorithm, or the first set of time parameters. UE 802 may also scramble, after ciphering the response message and prior to transmitting the response message, the response message based on at least one of the scrambling key, the scrambling algorithm, or the second set of time parameters.

At 890, UE 802 may transmit, to a second UE, a response message in response to the discovery message, where the response message is a second discovery message that includes at least response code. The response message may correspond to the response code in FIG. 7. As such, step 890 in FIG. 8 may correspond to step 724 in FIG. 7.

Figure 9:
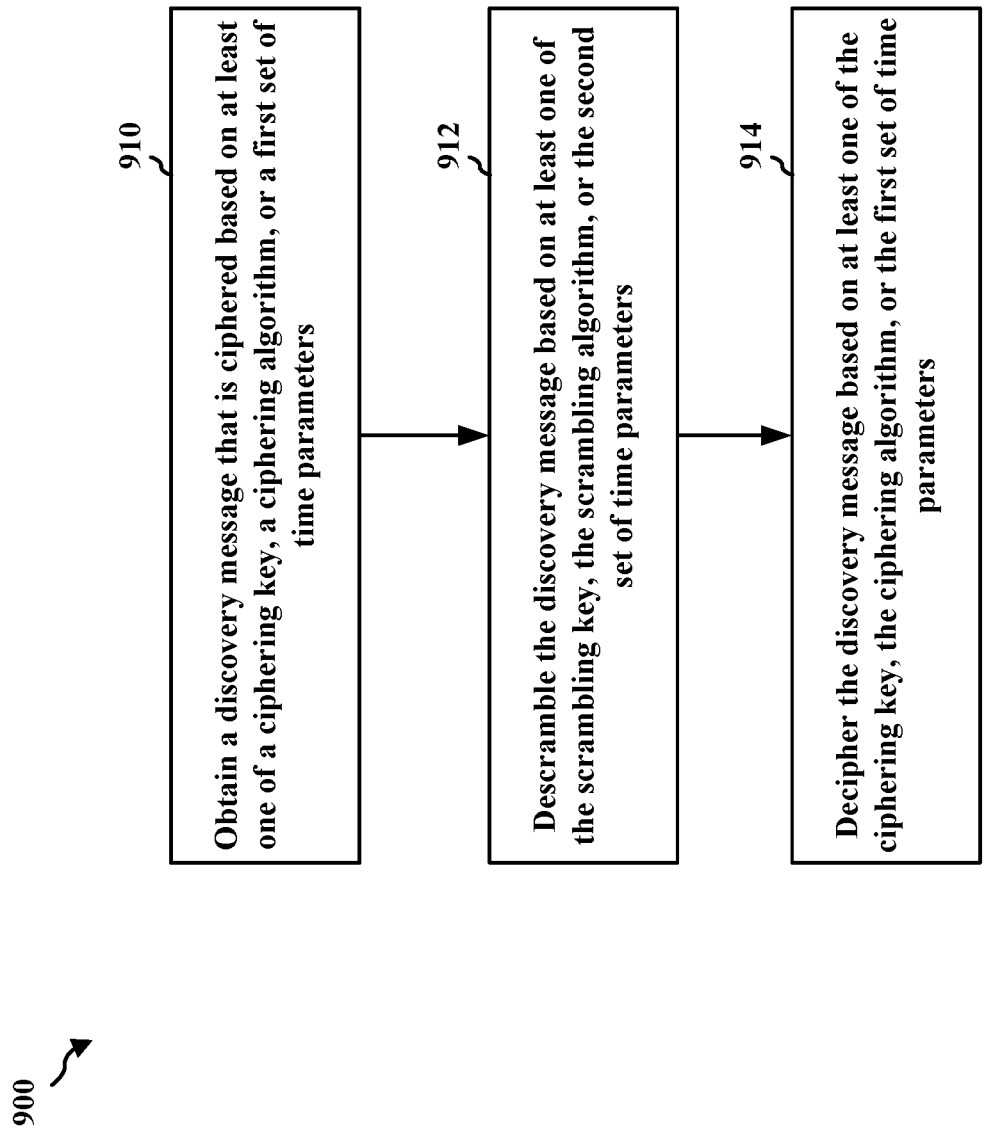
FIG. 9 is a flowchart of a method of wireless communication, in accordance with various aspects of the present disclosure.

FIG. 9 is a flowchart 900 of a method of wireless communication. The method may be performed by a UE (e.g., the UE 104; monitoring UE 601; announcing UE 602; discoverer UE 701; discoveree UE 702; the apparatus 1304). The UE may be a receiving UE (e.g., a monitoring UE that receives a discovery message from an announcing UE in a Model A restricted discovery security procedure, and/or a discoveree UE that receives a discovery message from a discoverer UE in a Model B restricted discovery security procedure). The methods described herein may provide a number of benefits, such as improving resource utilization and/or power savings.

At 910, the UE may obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters, as described in connection with the examples in FIGS. 1-8. For example, as described in 870 of FIG. 8, UE 802 may obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters. Further, step 910 may be performed by component 198 in FIG. 1. In some aspects, a first portion of the discovery message may be ciphered based on the ciphering key, the ciphering algorithm, or the first set of time parameters. A second portion of the discovery message may be scrambled based on the scrambling key, the scrambling algorithm, or the second set of time parameters, where the second portion may be different from the first portion. Also, the second portion may overlap with the first portion, where a size of the second portion may be less than or equal to a size of a key derivation function associated with scrambling key. Moreover, a third portion of the discovery message may not be scrambled, where the third portion may be different from the first portion and the second portion. The discovery message may be less than a defined size, and the discovery message may include an application layer group identifier (ID) code representing an application layer group ID, where the application layer group ID code may be a hash of the application layer group ID. Additionally, the first set of time parameters may include a counter that is associated with a first time instance, and the second set of time parameters may include the counter that is associated with a second time instance. Also, the first set of time parameters may be a first set of freshness parameters and the second set of time parameters may be a second set of freshness parameters, and the counter may be a coordinated universal time (UTC)-based counter. Further, to obtain the discovery message, the UE may receive, via at least one of a transceiver or an antenna, the discovery message from a second UE.

At 912, the UE may descramble the discovery message based on at least one of the scrambling key, the scrambling algorithm, or the second set of time parameters, as described in connection with the examples in FIGS. 1-8. For example, as described in 880 of FIG. 8, UE 802 may descramble the discovery message based on at least one of the scrambling key, the scrambling algorithm, or the second set of time parameters. Further, step 912 may be performed by component 198 in FIG. 1.

At 914, the UE may decipher the discovery message based on at least one of the ciphering key, the ciphering algorithm, or the first set of time parameters, as described in connection with the examples in FIGS. 1-8. For example, as described in 882 of FIG. 8, UE 802 may decipher the discovery message based on at least one of the ciphering key, the ciphering algorithm, or the first set of time parameters. Further, step 914 may be performed by component 198 in FIG. 1.

In some aspects, the UE may transmit, to the second UE, a response message responding to the discovery. In some aspects, the ciphering key may be derived based on a key obtained from a network function (e.g., DDNMF). In some aspects, the ciphering algorithm may be obtained from a network function (e.g., DDNMF). In some aspects, the scrambling algorithm may be configured by a system, and the scrambling algorithm may be different from the ciphering algorithm. In some aspects, a first portion of the discovery message may be ciphered based on the ciphering key, the ciphering algorithm, or the first set of freshness parameters. In some aspects, the first portion of the discovery message may be determined by a mask. In some aspects, the mask may be obtained from a network function or configured by the network function (e.g., DDNMF). In some aspects, the second UE may be a sending UE (Announcing UE that sends a discovery message to Monitoring UE in Model A or Discoverer UE that sends a discovery message to Discoveree UE and Discoveree UE replies with the response).

In some aspects, a second portion of the discovery message may be scrambled based on the scrambling key, the scrambling algorithm, or the second set of freshness parameters, and a third portion of the discovery message may be not scrambled. In some aspects, the second portion may overlap with the first portion. In some aspects, a size of the second portion may be less than or equal to a size of a key derivation function associated with scrambling key. In some aspects, the scrambling key may be a discovery user scrambling key (DUSK). In some aspects, the ciphering key may be at least based on a discovery user confidentiality key (DUCK), the first set of freshness parameters, or a message-specific parameter. In some aspects, the message-specific parameter may be a Message Integrity Check (MIC). In some aspects, the discovery message may be less than a defined size, and the discovery message may include an application layer group identifier (ID) code representing an application layer group ID. In some aspects, the application layer group ID code representing the application layer group ID may be a hash of the application layer group ID. In some aspects, the UE may transmit, to a direct discovery name management function (DDNMF) in a home public land mobile network (HPLMN), a discovery request message including a restricted proximity services (ProSe) application user identifier (RPAUID) associated with the UE, the discovery request message further including a sidelink UE security capability representing a list of supported ciphering algorithms including the ciphering algorithm. In some aspects, the UE may receive, from the DDNMF, a discovery response message including ProSe code, the discovery response message further including a chosen ciphering algorithm in the list of supported ciphering algorithms associated with the UE. In some aspects, the first set of freshness parameters may include a counter based on a first time, and the second set of freshness parameters may include the counter based on a second time.

Figure 10:
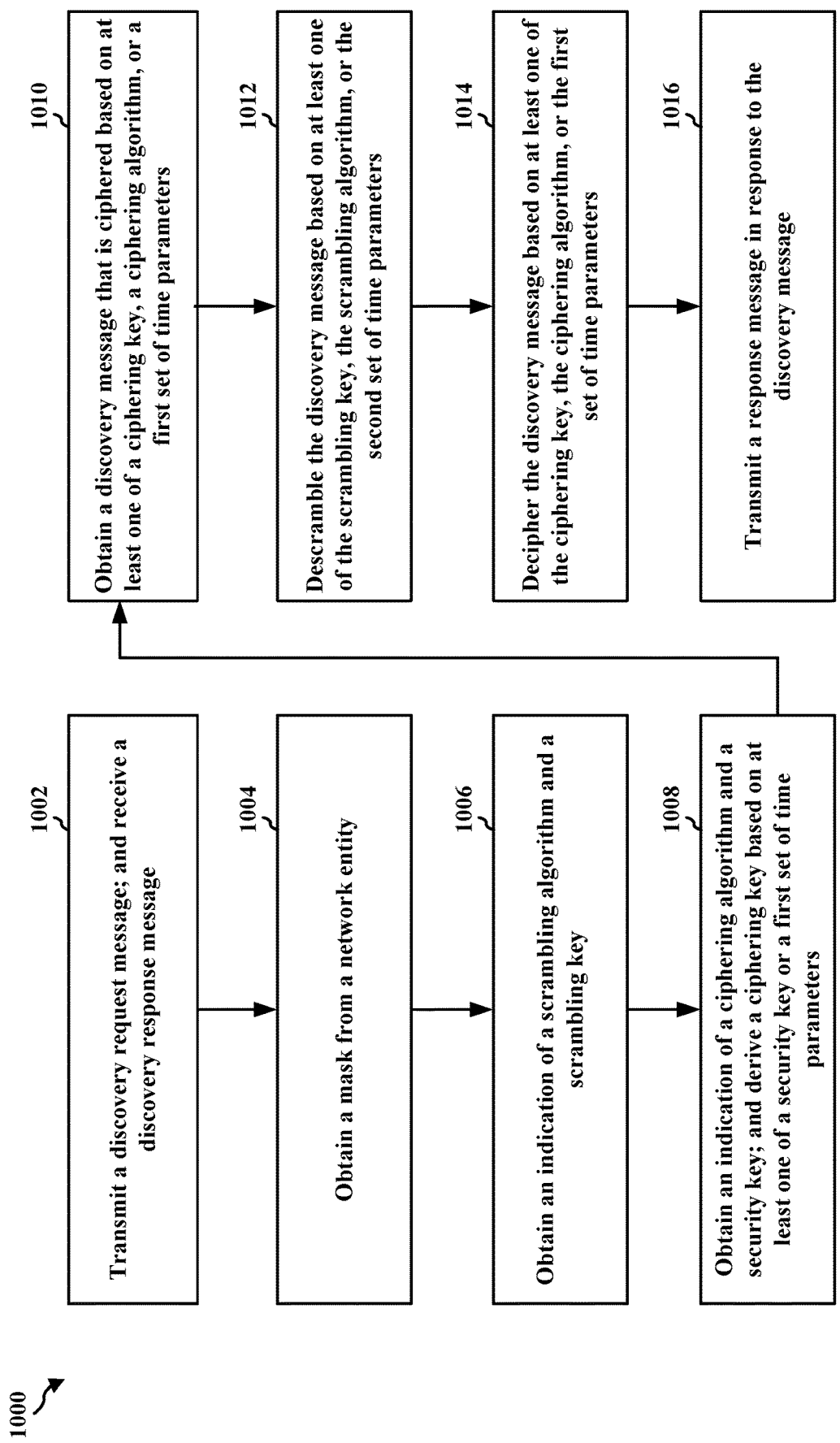
FIG. 10 is a flowchart of a method of wireless communication, in accordance with various aspects of the present disclosure.

FIG. 10 is a flowchart 1000 of a method of wireless communication. The method may be performed by a UE (e.g., the UE 104; monitoring UE 601; announcing UE 602; discoverer UE 701; discoveree UE 702; the apparatus 1304). The UE may be a receiving UE (e.g., a monitoring UE that receives a discovery message from an announcing UE in a Model A restricted discovery security procedure, and/or a discoveree UE that receives a discovery message from a discoverer UE in a Model B restricted discovery security procedure). The methods described herein may provide a number of benefits, such as improving resource utilization and/or power savings.

At 1002, the UE may transmit, to a network entity prior to obtaining a discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm, as described in connection with the examples in FIGS. 1-8. For example, as described in 810 of FIG. 8, UE 802 may transmit, to a network entity prior to obtaining a discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm. Further, step 1002 may be performed by component 198 in FIG. 1.

Also, at 1002, the UE may receive, from the network entity prior to obtaining the discovery message, a discovery response message including ProSe code, where the discovery response message further includes a chosen ciphering algorithm in the list of supported ciphering algorithms associated with the UE, as described in connection with the examples in FIGS. 1-8. For example, as described in 810 of FIG. 8, UE 802 may receive, from the network entity prior to obtaining the discovery message, a discovery response message including ProSe code, where the discovery response message further includes a chosen ciphering algorithm in the list of supported ciphering algorithms associated with the UE. Further, step 1002 may be performed by component 198 in FIG. 1. The discovery response message may further include at least one of a first set of security parameters, a second set of security parameters, a current time value, or a maximum time offset value.

At 1004, the UE may obtain, prior to obtaining a discovery message, a mask from a network entity, where the first portion of the discovery message is indicated by the mask, as described in connection with the examples in FIGS. 1-8. For example, as described in 822 of FIG. 8, UE 802 may obtain, prior to obtaining a discovery message, a mask from a network entity, where the first portion of the discovery message is indicated by the mask. Further, step 1004 may be performed by component 198 in FIG. 1.

At 1006, the UE may obtain, prior to obtaining a discovery message, an indication of the scrambling algorithm and the scrambling key, where the scrambling algorithm is different from the ciphering algorithm and the scrambling key is different from the ciphering key, as described in connection with the examples in FIGS. 1-8. For example, as described in 832 of FIG. 8, UE 802 may obtain, prior to obtaining a discovery message, an indication of the scrambling algorithm and the scrambling key, where the scrambling algorithm is different from the ciphering algorithm and the scrambling key is different from the ciphering key. Further, step 1006 may be performed by component 198 in FIG. 1. In some aspects, to obtain the indication of the scrambling algorithm and the scrambling key, the UE may receive, from a network entity, the indication of the scrambling algorithm and the scrambling key. Accordingly, the UE may receive, from a network entity, the indication of the scrambling algorithm and the scrambling key. Also, the network entity may be a direct discovery name management function (DDNMF) in a home public land mobile network (HPLMN). The scrambling key may be a discovery user scrambling key (DUSK).

At 1008, the UE may obtain, prior to obtaining a discovery message, an indication of the ciphering algorithm and a security key; and derive a ciphering key based on at least one of the security key or the first set of time parameters, as described in connection with the examples in FIGS. 1-8. For example, as described in 840 of FIG. 8, UE 802 may obtain, prior to obtaining a discovery message, an indication of the ciphering algorithm and a security key; and derive a ciphering key based on at least one of the security key or the first set of time parameters. Further, step 1008 may be performed by component 198 in FIG. 1. In some aspects, to obtain the indication of the ciphering algorithm and the security key, the UE may receive, from a network entity, the indication of the ciphering algorithm and the security key. Accordingly, the UE may receive, from a network entity, the indication of the ciphering algorithm and the security key. Also, the network entity may be a direct discovery name management function (DDNMF) in a home public land mobile network (HPLMN). Further, the ciphering key may be based on a discovery user confidentiality key (DUCK), the first set of time parameters, or a message-specific parameter, and the message-specific parameter may be a message integrity check (MIC) or a random string.

At 1010, the UE may obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters, as described in connection with the examples in FIGS. 1-8. For example, as described in 870 of FIG. 8, UE 802 may obtain a discovery message that is ciphered based on at least one of a ciphering key, a ciphering algorithm, and/or a first set of time parameters, where the discovery message is scrambled based on at least one of a scrambling key, a scrambling algorithm, or a second set of time parameters. Further, step 1010 may be performed by component 198 in FIG. 1. In some aspects, a first portion of the discovery message may be ciphered based on the ciphering key, the ciphering algorithm, or the first set of time parameters. A second portion of the discovery message may be scrambled based on the scrambling key, the scrambling algorithm, or the second set of time parameters, where the second portion may be different from the first portion. Also, the second portion may overlap with the first portion, where a size of the second portion may be less than or equal to a size of a key derivation function associated with scrambling key. Moreover, a third portion of the discovery message may not be scrambled, where the third portion may be different from the first portion and the second portion. The discovery message may be less than a defined size, and the discovery message may include an application layer group identifier (ID) code representing an application layer group ID, where the application layer group ID code may be a hash of the application layer group ID. Additionally, the first set of time parameters may include a counter that is associated with a first time instance, and the second set of time parameters may include the counter that is associated with a second time instance. Also, the first set of time parameters may be a first set of freshness parameters and the second set of time parameters may be a second set of freshness parameters, and the counter may be a coordinated universal time (UTC)-based counter. Further, to obtain the discovery message, the UE may receive, via at least one of a transceiver or an antenna, the discovery message from a second UE.

At 1012, the UE may descramble the discovery message based on at least one of the scrambling key, the scrambling algorithm, or the second set of time parameters, as described in connection with the examples in FIGS. 1-8. For example, as described in 880 of FIG. 8, UE 802 may descramble the discovery message based on at least one of the scrambling key, the scrambling algorithm, or the second set of time parameters. Further, step 1012 may be performed by component 198 in FIG. 1.

At 1014, the UE may decipher the discovery message based on at least one of the ciphering key, the ciphering algorithm, or the first set of time parameters, as described in connection with the examples in FIGS. 1-8. For example, as described in 882 of FIG. 8, UE 802 may decipher the discovery message based on at least one of the ciphering key, the ciphering algorithm, or the first set of time parameters. Further, step 1014 may be performed by component 198 in FIG. 1.

Additionally, the UE may cipher, prior to transmitting a response message, the response message based on at least one of the ciphering key, the ciphering algorithm, or the first set of time parameters. UE 802 may also scramble, after ciphering the response message and prior to transmitting the response message, the response message based on at least one of the scrambling key, the scrambling algorithm, or the second set of time parameters.

At 1016, the UE may transmit, to a second UE, a response message in response to the discovery message, where the response message is a second discovery message that includes at least response code, as described in connection with the examples in FIGS. 1-8. For example, as described in 890 of FIG. 8, UE 802 may transmit, to a second UE, a response message in response to the discovery message, where the response message is a second discovery message that includes at least response code. Further, step 1016 may be performed by component 198 in FIG. 1.

Figure 11:
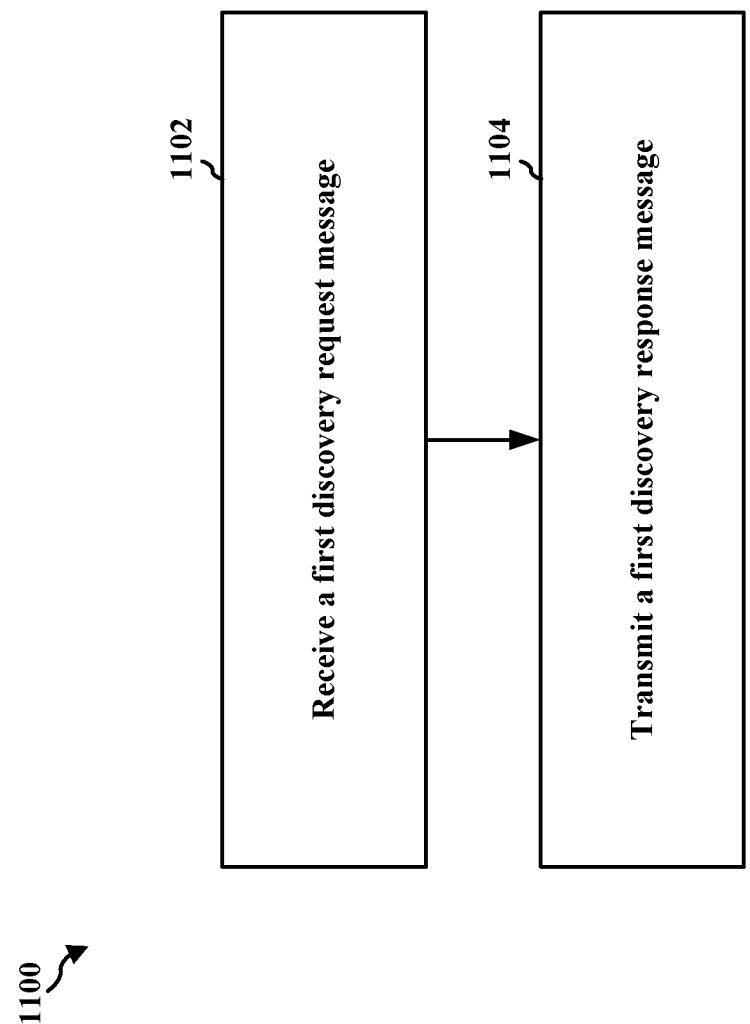
FIG. 11 is a flowchart of a method of wireless communication, in accordance with various aspects of the present disclosure.

FIG. 11 is a flowchart 1100 of a method of wireless communication. The method may be performed by a network entity or a base station (e.g., base station 102; DDNMF 603; DDNMF 604; DDNMF 605; DDNMF 703; DDNMF 704; DDNMF 705; network entity 1302; network entity 1402; network entity 1560), such as a DDNMF. The methods described herein may provide a number of benefits, such as improving resource utilization and/or power savings.

At 1102, the network entity may receive a first discovery request message including a restricted proximity services (ProSe) application user identifier (RPAUID), where the first discovery request message further includes a sidelink user equipment (UE) security capability representing a first list of supported ciphering algorithms associated with a first UE, as described in connection with the examples in FIGS. 1-8. For example, as described in 812 of FIG. 8, network entity 804 may receive a first discovery request message including a restricted proximity services (ProSe) application user identifier (RPAUID), where the first discovery request message further includes a sidelink user equipment (UE) security capability representing a first list of supported ciphering algorithms associated with a first UE. Further, step 1102 may be performed by discovery component 199 in FIG. 1. In some aspects, to receive the first discovery request message, the network entity may receive, via at least one of a transceiver or an antenna, the first discovery request message.

At 1104, the network entity may transmit a first discovery response message including ProSe code, where the first discovery response message further includes a chosen ciphering algorithm in the first list of supported ciphering algorithms associated with the first UE, as described in connection with the examples in FIGS. 1-8. For example, as described in 816 of FIG. 8, network entity 804 may transmit a first discovery response message including ProSe code, where the first discovery response message further includes a chosen ciphering algorithm in the first list of supported ciphering algorithms associated with the first UE. Further, step 1104 may be performed by discovery component 199 in FIG. 1.

In some aspects, the network entity may receive a first discovery request message including a restricted proximity services (ProSe) application user identifier (RPAUID), the first discovery request message further including a sidelink user equipment (UE) security capability representing a first list of supported ciphering algorithms associated with a first UE. The network entity may also transmit a first discovery response message including ProSe code, the first discovery response message further including a chosen ciphering algorithm in the first list of supported ciphering algorithms associated with the first UE. The network entity may also receive, from a second DDNMF, a second discovery request message further including a sidelink UE security capability representing a second list of supported ciphering algorithms associated with a second UE. The network entity may also transmit, to the second DDNMF, a second discovery response message including the ProSe code and the chosen ciphering algorithm.

Figure 12:
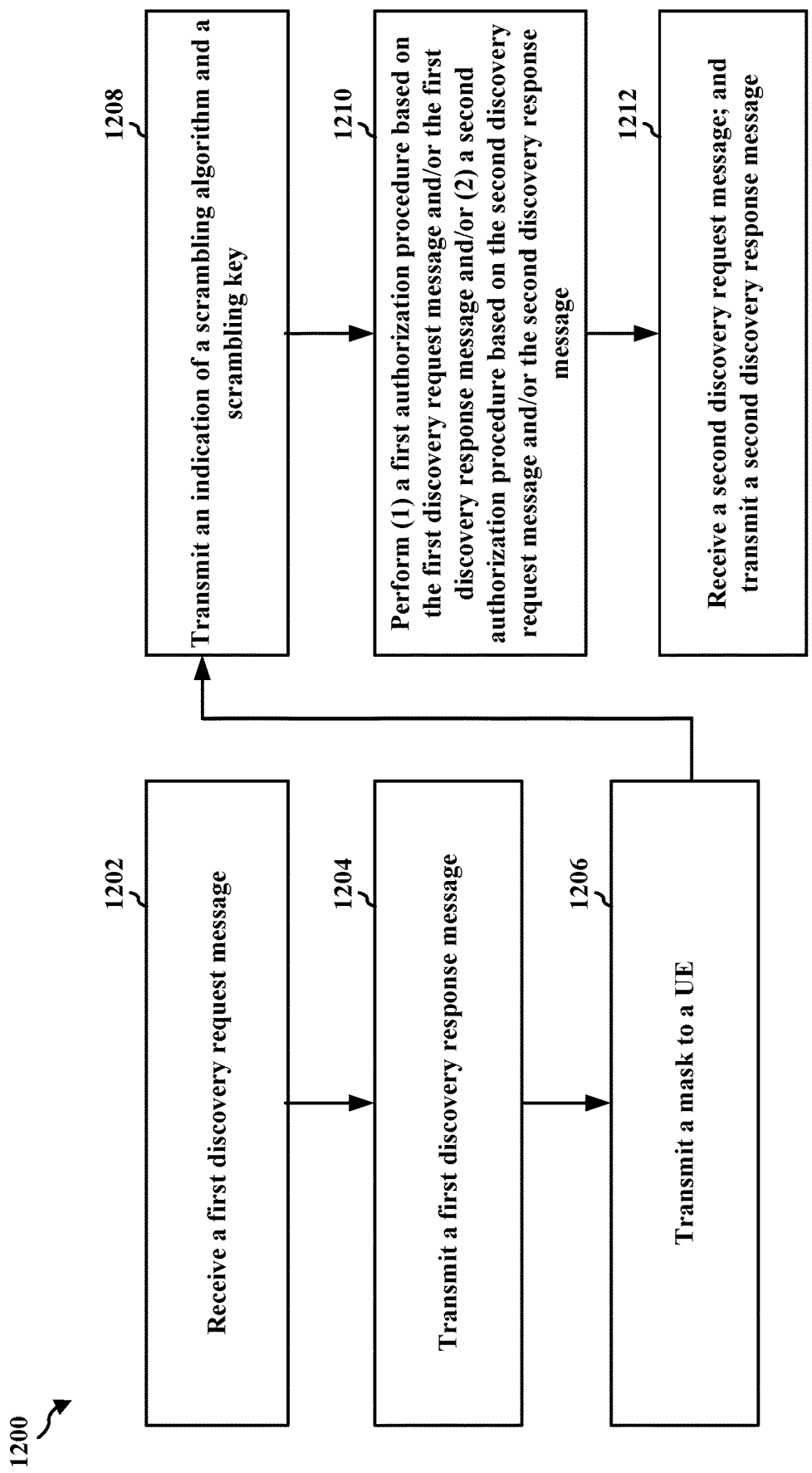
FIG. 12 is a flowchart of a method of wireless communication, in accordance with various aspects of the present disclosure.

FIG. 12 is a flowchart 1200 of a method of wireless communication. The method may be performed by a network entity or a base station (e.g., base station 102; DDNMF 603; DDNMF 604; DDNMF 605; DDNMF 703; DDNMF 704; DDNMF 705; network entity 1302; network entity 1402; network entity 1560), such as a DDNMF. The methods described herein may provide a number of benefits, such as improving resource utilization and/or power savings.

At 1202, the network entity may receive a first discovery request message including a restricted proximity services (ProSe) application user identifier (RPAUID), where the first discovery request message further includes a sidelink user equipment (UE) security capability representing a first list of supported ciphering algorithms associated with a first UE, as described in connection with the examples in FIGS. 1-8. For example, as described in 812 of FIG. 8, network entity 804 may receive a first discovery request message including a restricted proximity services (ProSe) application user identifier (RPAUID), where the first discovery request message further includes a sidelink user equipment (UE) security capability representing a first list of supported ciphering algorithms associated with a first UE. Further, step 1202 may be performed by discovery component 199 in FIG. 1. In some aspects, to receive the first discovery request message, the network entity may receive, via at least one of a transceiver or an antenna, the first discovery request message.

At 1204, the network entity may transmit a first discovery response message including ProSe code, where the first discovery response message further includes a chosen ciphering algorithm in the first list of supported ciphering algorithms associated with the first UE, as described in connection with the examples in FIGS. 1-8. For example, as described in 816 of FIG. 8, network entity 804 may transmit a first discovery response message including ProSe code, where the first discovery response message further includes a chosen ciphering algorithm in the first list of supported ciphering algorithms associated with the first UE. Further, step 1204 may be performed by discovery component 199 in FIG. 1.

At 1206, the network entity may transmit a mask for the first UE, where the first portion of the discovery message is indicated by the mask, as described in connection with the examples in FIGS. 1-8. For example, as described in 820 of FIG. 8, network entity 804 may transmit a mask for the first UE, where the first portion of the discovery message is indicated by the mask. Further, step 1206 may be performed by discovery component 199 in FIG. 1.

At 1208, the network entity may transmit, for the first UE, an indication of the scrambling algorithm and the scrambling key, where the scrambling algorithm is different from the ciphering algorithm and the scrambling key is different from the ciphering key, as described in connection with the examples in FIGS. 1-8. For example, as described in 830 of FIG. 8, network entity 804 may transmit, for the first UE, an indication of the scrambling algorithm and the scrambling key, where the scrambling algorithm is different from the ciphering algorithm and the scrambling key is different from the ciphering key. Further, step 1208 may be performed by discovery component 199 in FIG. 1.

At 1210, the network entity may perform at least one of: (1) a first authorization procedure based on at least one of the first discovery request message or the first discovery response message or (2) a second authorization procedure based on at least one of the second discovery request message or the second discovery response message, as described in connection with the examples in FIGS. 1-8. For example, as described in 850 of FIG. 8, network entity 804 may perform at least one of: (1) a first authorization procedure based on at least one of the first discovery request message or the first discovery response message or (2) a second authorization procedure based on at least one of the second discovery request message or the second discovery response message. Further, step 1210 may be performed by discovery component 199 in FIG. 1.

At 1212, the network entity may receive, from a second network entity after transmitting the first discovery response message, a second discovery request message further including a sidelink UE security capability representing a second list of supported ciphering algorithms associated with a second UE, as described in connection with the examples in FIGS. 1-8. For example, as described in 860 of FIG. 8, network entity 804 may receive, from a second network entity after transmitting the first discovery response message, a second discovery request message further including a sidelink UE security capability representing a second list of supported ciphering algorithms associated with a second UE. Further, step 1212 may be performed by discovery component 199 in FIG. 1.

Also, at 1212, the network entity may transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN, as described in connection with the examples in FIGS. 1-8. For example, as described in 860 of FIG. 8, network entity 804 may transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. Further, step 1212 may be performed by discovery component 199 in FIG. 1. The first discovery response message may further include at least one of a first set of security parameters, a second set of security parameters, a current time value, or a maximum time offset value, and the second discovery response message may further include at least one of the first set of security parameters, the second set of security parameters, the current time value, or the maximum time offset value.

Figure 13:
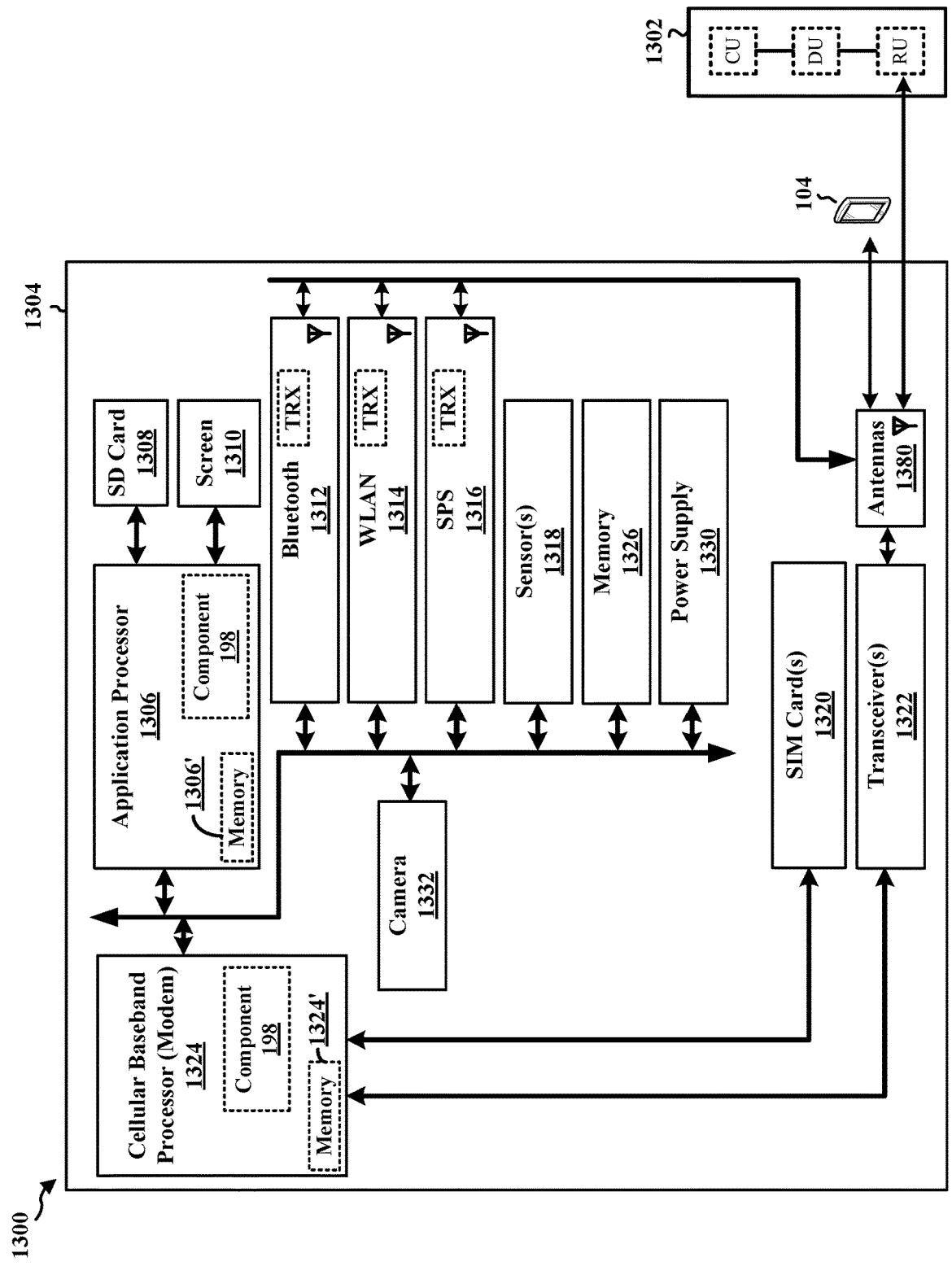
FIG. 13 is a diagram illustrating an example of a hardware implementation for an example apparatus and/or network entity, in accordance with various aspects of the present disclosure.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see UE 350 of FIG. 3) and include the additional modules of the apparatus 1304.

As discussed supra, the discovery component 198 may be configured to obtain a discovery message that is ciphered based on at least one of a ciphering key, a ciphering algorithm, or a first set of time parameters, where the discovery message is scrambled based on at least one of a scrambling key, a scrambling algorithm, or a second set of time parameters. The discovery component 198 may also be configured to descramble the discovery message based on at least one of the scrambling key, the scrambling algorithm, or the second set of time parameters. The discovery component 198 may also be configured to decipher the discovery message based on at least one of the ciphering key, the ciphering algorithm, or the first set of time parameters. The discovery component 198 may also be configured to transmit, to a second UE, a response message in response to the discovery message, where the response message is a second discovery message that includes at least response code. The discovery component 198 may also be configured to cipher, prior to transmitting the response message, the response message based on at least one of the ciphering key, the ciphering algorithm, or the first set of time parameters. The discovery component 198 may also be configured to scramble, after ciphering the response message and prior to transmitting the response message, the response message based on at least one of the scrambling key, the scrambling algorithm, or the second set of time parameters. The discovery component 198 may also be configured to obtain, prior to obtaining the discovery message, an indication of the ciphering algorithm and a security key. The discovery component 198 may also be configured to derive the ciphering key based on at least one of the security key or the first set of time parameters. The discovery component 198 may also be configured to obtain, prior to obtaining the discovery message, an indication of the scrambling algorithm and the scrambling key, where the scrambling algorithm is different from the ciphering algorithm and the scrambling key is different from the ciphering key. The discovery component 198 may also be configured to obtain, prior to obtaining the discovery message, a mask from a network entity, where the first portion of the discovery message is indicated by the mask. The discovery component 198 may also be configured to transmit, to a network entity prior to obtaining the discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm. The discovery component 198 may also be configured to receive, from the network entity prior to obtaining the discovery message, a discovery response message including ProSe code, where the discovery response message further includes a chosen ciphering algorithm in the list of supported ciphering algorithms associated with the UE. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for obtaining a discovery message that is ciphered based on at least one of a ciphering key, a ciphering algorithm, or a first set of time parameters, where the discovery message is scrambled based on at least one of a scrambling key, a scrambling algorithm, or a second set of time parameters. The apparatus 1304 may also include means for descrambling the discovery message based on at least one of the scrambling key, the scrambling algorithm, or the second set of time parameters. The apparatus 1304 may also include means for deciphering the discovery message based on at least one of the ciphering key, the ciphering algorithm, or the first set of time parameters. The apparatus 1304 may also include means for transmitting, to a second UE, a response message in response to the discovery message, where the response message is a second discovery message that includes at least response code. The apparatus 1304 may also include means for ciphering, prior to transmitting the response message, the response message based on at least one of the ciphering key, the ciphering algorithm, or the first set of time parameters. The apparatus 1304 may also include means for scrambling, after ciphering the response message and prior to transmitting the response message, the response message based on at least one of the scrambling key, the scrambling algorithm, or the second set of time parameters. The apparatus 1304 may also include means for obtaining, prior to obtaining the discovery message, an indication of the ciphering algorithm and a security key. The apparatus 1304 may also include means for deriving the ciphering key based on at least one of the security key or the first set of time parameters. The apparatus 1304 may also include means for obtaining, prior to obtaining the discovery message, an indication of the scrambling algorithm and the scrambling key, where the scrambling algorithm is different from the ciphering algorithm and the scrambling key is different from the ciphering key. The apparatus 1304 may also include means for obtaining, prior to obtaining the discovery message, a mask from a network entity, where the first portion of the discovery message is indicated by the mask. The apparatus 1304 may also include means for transmitting, to a network entity prior to obtaining the discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm. The apparatus 1304 may also include means for receiving, from the network entity prior to obtaining the discovery message, a discovery response message including ProSe code, where the discovery response message further includes a chosen ciphering algorithm in the list of supported ciphering algorithms associated with the UE. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
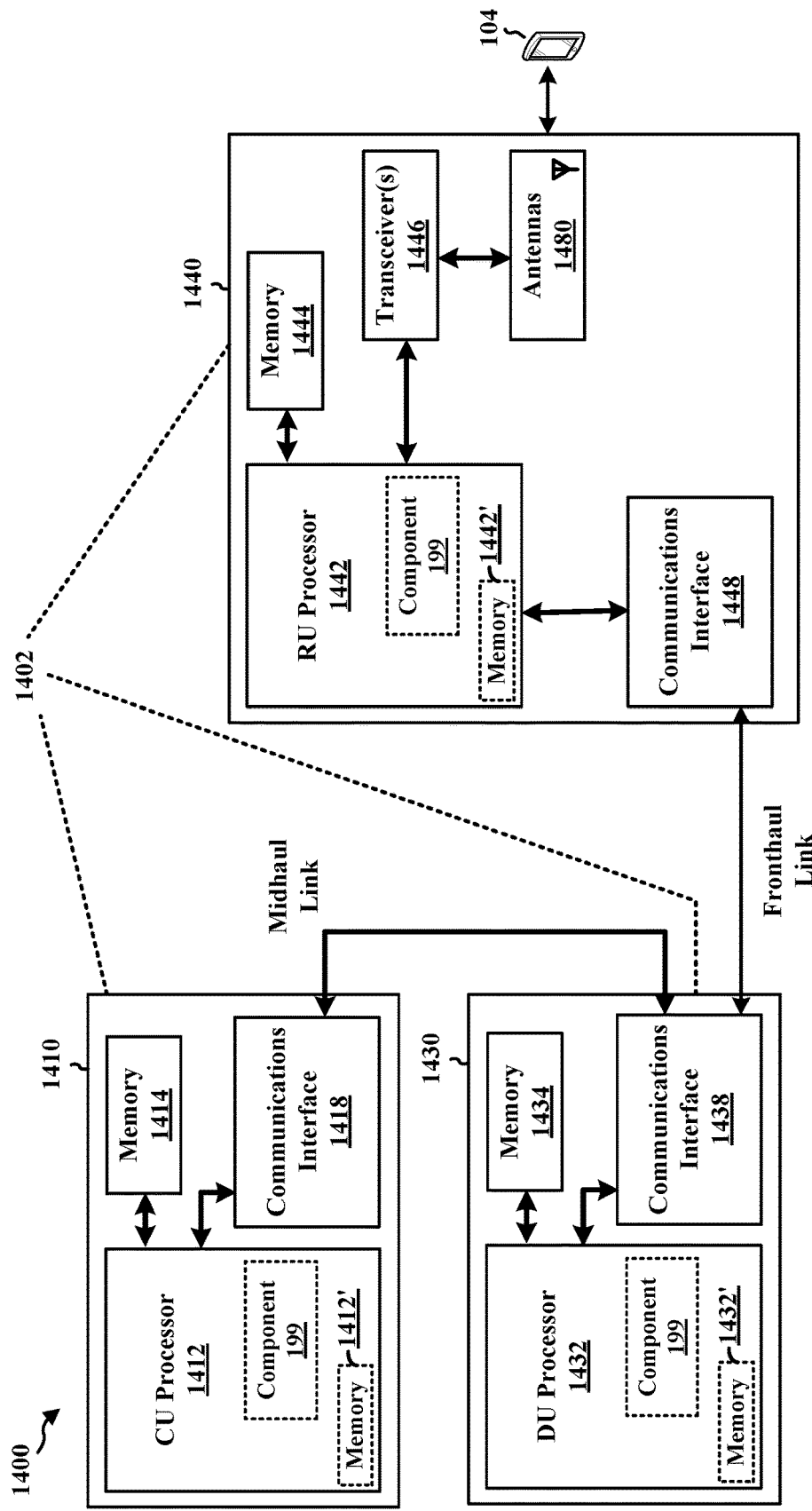
FIG. 14 is a diagram illustrating an example of a hardware implementation for an example network entity, in accordance with various aspects of the present disclosure.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the discovery component 199 may be configured to receive a first discovery request message including a restricted proximity services (ProSe) application user identifier (RPAUID), where the first discovery request message further includes a sidelink user equipment (UE) security capability representing a first list of supported ciphering algorithms associated with a first UE. The discovery component 199 may also be configured to transmit a first discovery response message including ProSe code, where the first discovery response message further includes a chosen ciphering algorithm in the first list of supported ciphering algorithms associated with the first UE. The discovery component 199 may also be configured to receive, from a second network entity after transmitting the first discovery response message, a second discovery request message further including a sidelink UE security capability representing a second list of supported ciphering algorithms associated with a second UE. The discovery component 199 may also be configured to transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. The discovery component 199 may also be configured to transmit a mask for the first UE, where the first portion of the discovery message is indicated by the mask. The discovery component 199 may also be configured to transmit, for the first UE, an indication of the scrambling algorithm and the scrambling key, where the scrambling algorithm is different from the ciphering algorithm and the scrambling key is different from the ciphering key. The discovery component 199 may also be configured to perform at least one of: (1) a first authorization procedure based on at least one of the first discovery request message or the first discovery response message or (2) a second authorization procedure based on at least one of the second discovery request message or the second discovery response message. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for receiving a first discovery request message including a restricted proximity services (ProSe) application user identifier (RPAUID), where the first discovery request message further includes a sidelink user equipment (UE) security capability representing a first list of supported ciphering algorithms associated with a first UE. The network entity 1402 may include means for transmitting a first discovery response message including ProSe code, where the first discovery response message further includes a chosen ciphering algorithm in the first list of supported ciphering algorithms associated with the first UE. The network entity 1402 may include means for receiving, from a second network entity after transmitting the first discovery response message, a second discovery request message further including a sidelink UE security capability representing a second list of supported ciphering algorithms associated with a second UE. The network entity 1402 may include means for transmitting, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. The network entity 1402 may include means for transmitting a mask for the first UE, where the first portion of the discovery message is indicated by the mask. The network entity 1402 may include means for transmitting, for the first UE, an indication of the scrambling algorithm and the scrambling key, where the scrambling algorithm is different from the ciphering algorithm and the scrambling key is different from the ciphering key. The network entity 1402 may include means for performing at least one of: (1) a first authorization procedure based on at least one of the first discovery request message or the first discovery response message or (2) a second authorization procedure based on at least one of the second discovery request message or the second discovery response message. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
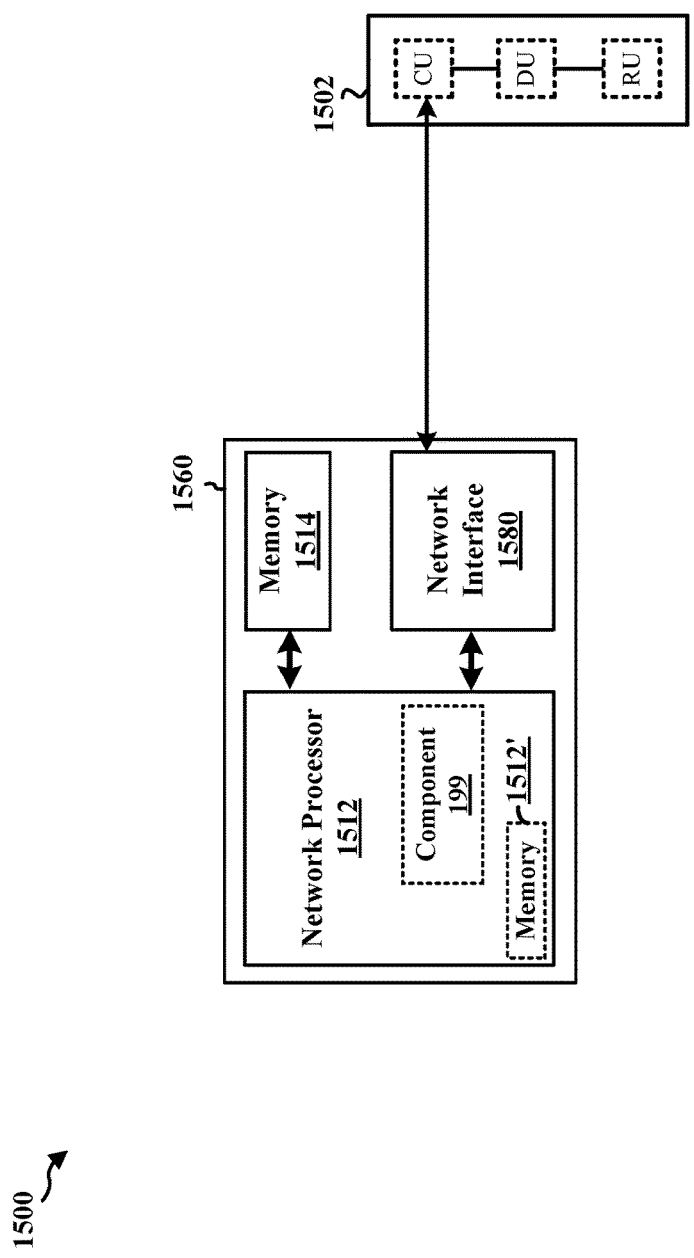
FIG. 15 is a diagram illustrating an example of a hardware implementation for an example network entity, in accordance with various aspects of the present disclosure.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the discovery component 199 may be configured to receive a first discovery request message including a restricted proximity services (ProSe) application user identifier (RPAUID), where the first discovery request message further includes a sidelink user equipment (UE) security capability representing a first list of supported ciphering algorithms associated with a first UE. The discovery component 199 may also be configured to transmit a first discovery response message including ProSe code, where the first discovery response message further includes a chosen ciphering algorithm in the first list of supported ciphering algorithms associated with the first UE. The discovery component 199 may also be configured to receive, from a second network entity after transmitting the first discovery response message, a second discovery request message further including a sidelink UE security capability representing a second list of supported ciphering algorithms associated with a second UE. The discovery component 199 may also be configured to transmit, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. The discovery component 199 may also be configured to transmit a mask for the first UE, where the first portion of the discovery message is indicated by the mask. The discovery component 199 may also be configured to transmit, for the first UE, an indication of the scrambling algorithm and the scrambling key, where the scrambling algorithm is different from the ciphering algorithm and the scrambling key is different from the ciphering key. The discovery component 199 may also be configured to perform at least one of: (1) a first authorization procedure based on at least one of the first discovery request message or the first discovery response message or (2) a second authorization procedure based on at least one of the second discovery request message or the second discovery response message. The component 199 may be within the processor 1512. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 may include means for receiving a first discovery request message including a restricted proximity services (ProSe) application user identifier (RPAUID), where the first discovery request message further includes a sidelink user equipment (UE) security capability representing a first list of supported ciphering algorithms associated with a first UE. The network entity 1560 may also include means for transmitting a first discovery response message including ProSe code, where the first discovery response message further includes a chosen ciphering algorithm in the first list of supported ciphering algorithms associated with the first UE. The network entity 1560 may also include means for receiving, from a second network entity after transmitting the first discovery response message, a second discovery request message further including a sidelink UE security capability representing a second list of supported ciphering algorithms associated with a second UE. The network entity 1560 may also include means for transmitting, for the second network entity after receiving the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN. The network entity 1560 may also include means for transmitting a mask for the first UE, where the first portion of the discovery message is indicated by the mask. The network entity 1560 may also include means for transmitting, for the first UE, an indication of the scrambling algorithm and the scrambling key, where the scrambling algorithm is different from the ciphering algorithm and the scrambling key is different from the ciphering key. The network entity 1560 may also include means for performing at least one of: (1) a first authorization procedure based on at least one of the first discovery request message or the first discovery response message or (2) a second authorization procedure based on at least one of the second discovery request message or the second discovery response message. The means may be the component 199 of the network entity 1560 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a first user equipment (UE), including: a memory; and at least one processor coupled to the memory and, based at least in part on information stored in the memory, the at least one processor is configured to: obtain a discovery message that is ciphered based on at least one of a ciphering key, a ciphering algorithm, or a first set of time parameters, where the discovery message is scrambled based on at least one of a scrambling key, a scrambling algorithm, or a second set of time parameters; descramble the discovery message based on at least one of the scrambling key, the scrambling algorithm, or the second set of time parameters; and decipher the discovery message based on at least one of the ciphering key, the ciphering algorithm, or the first set of time parameters.

Aspect 2 is the apparatus of aspect 1, where the at least one processor is further configured to: transmit, to a second UE, a response message in response to the discovery message, where the response message is a second discovery message that includes at least response code.

Aspect 3 is the apparatus of aspect 2, where the at least one processor is further configured to: cipher, prior to the transmission of the response message, the response message based on at least one of the ciphering key, the ciphering algorithm, or the first set of time parameters; and scramble, prior to the transmission of the response message, the response message based on at least one of the scrambling key, the scrambling algorithm, or the second set of time parameters.

Aspect 4 is the apparatus of any of aspects 1 to 3, where the at least one processor is further configured to: obtain, prior to the obtainment of the discovery message, an indication of the ciphering algorithm and a security key; and derive the ciphering key based on at least one of the security key or the first set of time parameters.

Aspect 5 is the apparatus of aspect 4, where to obtain the indication of the ciphering algorithm and the security key, the at least one processor is configured to: receive, from a network entity, the indication of the ciphering algorithm and the security key, and where the network entity is a direct discovery name management function (DDNMF) in a home public land mobile network (HPLMN).

Aspect 6 is the apparatus of any of aspects 4 to 5, where the ciphering key is based on a discovery user confidentiality key (DUCK), the first set of time parameters, or a message-specific parameter, and where the message-specific parameter is a message integrity check (MIC) or a random string.

Aspect 7 is the apparatus of any of aspects 1 to 6, where the at least one processor is further configured to: obtain, prior to the obtainment of the discovery message, an indication of the scrambling algorithm and the scrambling key, where the scrambling algorithm is different from the ciphering algorithm and the scrambling key is different from the ciphering key.

Aspect 8 is the apparatus of aspect 7, where to obtain the indication of the scrambling algorithm and the scrambling key, the at least one processor is configured to: receive, from a network entity, the indication of the scrambling algorithm and the scrambling key, and where the network entity is a direct discovery name management function (DDNMF) in a home public land mobile network (HPLMN).

Aspect 9 is the apparatus of any of aspects 7 to 8, where the scrambling key is a discovery user scrambling key (DUSK).

Aspect 10 is the apparatus of any of aspects 1 to 9, where a first portion of the discovery message is ciphered based on the ciphering key, the ciphering algorithm, or the first set of time parameters.

Aspect 11 is the apparatus of aspect 10, where the at least one processor is further configured to: obtain, prior to the obtainment of the discovery message, a mask from a network entity, where the first portion of the discovery message is indicated by the mask.

Aspect 12 is the apparatus of any of aspects 10 to 11, where a second portion of the discovery message is scrambled based on the scrambling key, the scrambling algorithm, or the second set of time parameters, where the second portion is different from the first portion.

Aspect 13 is the apparatus of aspect 12, where the second portion overlaps with the first portion, where a size of the second portion is less than or equal to a size of a key derivation function associated with scrambling key.

Aspect 14 is the apparatus of any of aspects 12 to 13, where a third portion of the discovery message is not scrambled, where the third portion is different from the first portion and the second portion.

Aspect 15 is the apparatus of any of aspects 1 to 14, where the discovery message is less than a defined size, and where the discovery message includes an application layer group identifier (ID) code representing an application layer group ID, where the application layer group ID code is a hash of the application layer group ID.

Aspect 16 is the apparatus of any of aspects 1 to 15, where the at least one processor is further configured to: transmit, to a network entity prior to obtaining the discovery message, a discovery request message including a restricted proximity services (ProSe) application user identifier (RPAUID) associated with the UE, where the discovery request message further includes a sidelink UE security capability representing a list of supported ciphering algorithms including the ciphering algorithm; and receive, from the network entity prior to the obtainment of the discovery message, a discovery response message including ProSe code, where the discovery response message further includes a chosen ciphering algorithm in the list of supported ciphering algorithms associated with the UE.

Aspect 17 is the apparatus of aspect 16, where the discovery response message further includes at least one of a first set of security parameters, a second set of security parameters, a current time value, or a maximum time offset value.

Aspect 18 is the apparatus of any of aspects 1 to 17, where the first set of time parameters includes a counter that is associated with a first time instance, and where the second set of time parameters includes the counter that is associated with a second time instance.

Aspect 19 is the apparatus of any of aspects 1 to 18, where the first set of time parameters is a first set of freshness parameters and the second set of time parameters is a second set of freshness parameters, and where the counter is a coordinated universal time (UTC)-based counter.

Aspect 20 is the apparatus of any of aspects 1 to 19, where the apparatus is a wireless communication device, further including at least one of a transceiver or an antenna coupled to the at least one processor, where to obtain the discovery message, the at least one processor is configured to receive, via at least one of the transceiver or the antenna, the discovery message from a second UE.

Aspect 21 is an apparatus for wireless communication at a first network entity, including: a memory; and at least one processor coupled to the memory and, based at least in part on information stored in the memory, the at least one processor is configured to: receive a first discovery request message including a restricted proximity services (ProSe) application user identifier (RPAUID), where the first discovery request message further includes a sidelink user equipment (UE) security capability representing a first list of supported ciphering algorithms associated with a first UE; and transmit a first discovery response message including ProSe code, where the first discovery response message further includes a chosen ciphering algorithm in the first list of supported ciphering algorithms associated with the first UE.

Aspect 22 is the apparatus of aspect 21, where the at least one processor is further configured to: receive, from a second network entity after the transmission of the first discovery response message, a second discovery request message further including a sidelink UE security capability representing a second list of supported ciphering algorithms associated with a second UE.

Aspect 23 is the apparatus of aspect 22, where the at least one processor is further configured to: transmit, for the second network entity after the reception of the second discovery request message, a second discovery response message including the ProSe code and the chosen ciphering algorithm, where the first network entity is a first direct discovery name management function (DDNMF) in a home public land mobile network (HPLMN), and where the second network entity is a second DDNMF in the HPLMN.

Aspect 24 is the apparatus of aspect 23, where the first discovery response message further includes at least one of a first set of security parameters, a second set of security parameters, a current time value, or a maximum time offset value, and where the second discovery response message further includes at least one of the first set of security parameters, the second set of security parameters, the current time value, or the maximum time offset value.

Aspect 25 is the apparatus of any of aspects 23 to 24, where the at least one processor is further configured to: perform at least one of: (1) a first authorization procedure based on at least one of the first discovery request message or the first discovery response message or (2) a second authorization procedure based on at least one of the second discovery request message or the second discovery response message.

Aspect 26 is the apparatus of any of aspects 21 to 25, where the at least one processor further configured to: transmit a mask for the first UE, where a first portion of a discovery message is indicated by the mask.

Aspect 27 is the apparatus of aspect 26, where the at least one processor further configured to: transmit, for the first UE, an indication of a scrambling algorithm and a scrambling key, where the discovery message is associated with at least one of the scrambling algorithm, the scrambling key, a ciphering algorithm, or a ciphering key, and where the scrambling algorithm is different from the ciphering algorithm and the scrambling key is different from the ciphering key.

Aspect 28 is the apparatus of any of aspects 21 to 27, where the apparatus is a wireless communication device, further including at least one of a transceiver or an antenna coupled to the at least one processor, where to receive first discovery request message, the at least one processor is configured to receive, via at least one of the transceiver or the antenna, the first discovery request message.

Aspect 29 is a method of wireless communication for implementing any of aspects 1 to 19.

Aspect 30 is a method of wireless communication for implementing any of aspects 21 to 27.

Aspect 31 is an apparatus for wireless communication including means for implementing any of aspects 1 to 19.

Aspect 32 is an apparatus for wireless communication including means for implementing any of aspects 21 to 27.

Aspect 33 is a computer-readable medium (e.g., a non-transitory computer-readable medium) storing computer executable code, the code when executed by at least one processor causes the at least one processor to implement any of aspects 1 to 19.

Aspect 34 is a computer-readable medium (e.g., a non-transitory computer-readable medium) storing computer executable code, the code when executed by at least one processor causes the at least one processor to implement any of aspects 21 to 27.

What is claimed is:

1. An apparatus for wireless communication at a first user equipment (UE), comprising:
    a memory; and
    at least one processor coupled to the memory and, based at least in part on information stored in the memory, the at least one processor is configured to:
        obtain a discovery message, wherein a first portion of the discovery message is ciphered based on at least one of a ciphering key, a ciphering algorithm, or a first set of time parameters, wherein a second portion of the discovery message is scrambled based on at least one of a scrambling key, a scrambling algorithm, and a second set of time parameters, wherein the second portion is different from the first portion, wherein the second portion overlaps the first portion, wherein a size of the second portion is less than or equal to a size of a key derivation function associated with the scrambling key, wherein the scrambling algorithm is based on a time-hash-bitsequence keystream set to L least significant bits of an output of the key derivation function, and wherein L corresponds to a length of the discovery message to be scrambled;
        descramble the discovery message based on at least one of the scrambling key, the scrambling algorithm, or the second set of time parameters;
        decipher the discovery message based on at least one of the ciphering key, the ciphering algorithm, or the first set of time parameters; and
        transmit, to a second UE, a response message in response to the discovery message, wherein the response message is a second discovery message that includes at least a response code.

2. The apparatus of claim 1, wherein the at least one processor is further configured to:
    cipher the response message based on at least one of the ciphering key, the ciphering algorithm, or the first set of time parameters; and
    scramble the response message based on at least one of the scrambling key, the scrambling algorithm, or the second set of time parameters.

3. The apparatus of claim 1, wherein the at least one processor is further configured to:
    obtain an indication of the ciphering algorithm and a security key; and
    derive the ciphering key based on at least one of the security key or the first set of time parameters.

4. The apparatus of claim 3, wherein to obtain the indication of the ciphering algorithm and the security key, the at least one processor is configured to: receive, from a network entity, the indication of the ciphering algorithm and the security key, and wherein the network entity is a direct discovery name management function (DDNMF) in a home public land mobile network (HPLMN).

5. The apparatus of claim 3, wherein the ciphering key is based on a discovery user confidentiality key (DUCK), the first set of time parameters, or a message-specific parameter, and wherein the message-specific parameter is a message integrity check (MIC) or a random string.

6. The apparatus of claim 1, wherein the at least one processor is further configured to:
    obtain an indication of the scrambling algorithm and the scrambling key, wherein the scrambling algorithm is different from the ciphering algorithm and the scrambling key is different from the ciphering key.

7. The apparatus of claim 6, wherein to obtain the indication of the scrambling algorithm and the scrambling key, the at least one processor is configured to: receive, from a network entity, the indication of the scrambling algorithm and the scrambling key, and wherein the network entity is a direct discovery name management function (DDNMF) in a home public land mobile network (HPLMN).

8. The apparatus of claim 6, wherein the scrambling key is a discovery user scrambling key (DUSK).

9. The apparatus of claim 1, wherein the at least one processor is further configured to:
obtain a mask from a network entity, wherein the first portion of the discovery message is indicated by the mask.

10. The apparatus of claim 1, wherein a third portion of the discovery message is not scrambled, wherein the third portion is different from the first portion and the second portion.

11. The apparatus of claim 1, wherein the discovery message is less than a defined size, and wherein the discovery message comprises an application layer group identifier (ID) code representing an application layer group ID, wherein the application layer group ID code is a hash of the application layer group ID.

12. The apparatus of claim 1, wherein the at least one processor is further configured to:
transmit, to a network entity, a discovery request message comprising a restricted proximity services (ProSe) application user identifier (RPAUID) associated with the UE, wherein the discovery request message further comprises a sidelink UE security capability representing a list of supported ciphering algorithms comprising the ciphering algorithm; and
receive, from the network entity, a discovery response message comprising ProSe code, wherein the discovery response message further comprises a chosen ciphering algorithm in the list of supported ciphering algorithms associated with the UE.

13. The apparatus of claim 12, wherein the discovery response message further comprises at least one of a first set of security parameters, a second set of security parameters, a current time value, or a maximum time offset value.

14. The apparatus of claim 1, wherein the first set of time parameters comprises a counter that is associated with a first time instance, and wherein the second set of time parameters comprises the counter that is associated with a second time instance.

15. The apparatus of claim 14, wherein the first set of time parameters is a first set of freshness parameters and the second set of time parameters is a second set of freshness parameters, and wherein the counter is a coordinated universal time (UTC)-based counter.

16. The apparatus of claim 1, wherein the apparatus is a wireless communication device, further comprising at least one of a transceiver or an antenna coupled to the at least one processor, wherein to obtain the discovery message, the at least one processor is configured to receive, via at least one of the transceiver or the antenna, the discovery message from the second UE.

17. A method of wireless communication at a first user equipment (UE), comprising:
obtaining a discovery message, wherein a first portion of the discovery message is ciphered based on at least one of a ciphering key, a ciphering algorithm, or a first set of time parameters, wherein a second portion of the discovery message is scrambled based on at least one of a scrambling key, a scrambling algorithm, and a second set of time parameters, wherein the second portion is different from the first portion, wherein the second portion overlaps the first portion, wherein a size of the second portion is less than or equal to a size of a key derivation function associated with the scrambling key, wherein the scrambling algorithm is based on a time-hash-bitsequence keystream set to L least significant bits of an output of the key derivation function, and wherein L corresponds to a length of the discovery message to be scrambled;
descrambling the discovery message based on at least one of the scrambling key, the scrambling algorithm, or the second set of time parameters;
deciphering the discovery message based on at least one of the ciphering key, the ciphering algorithm, or the first set of time parameters; and
transmitting, to a second UE, a response message in response to the discovery message, wherein the response message is a second discovery message that includes at least a response code.

18. The method of claim 17, further comprising:
ciphering the response message based on at least one of the ciphering key, the ciphering algorithm, or the first set of time parameters; and
scrambling the response message based on at least one of the scrambling key, the scrambling algorithm, or the second set of time parameters.

19. The method of claim 17, further comprising:
obtaining an indication of the ciphering algorithm and a security key; and
deriving the ciphering key based on at least one of the security key or the first set of time parameters.

20. The method of claim 19, wherein obtaining the indication of the ciphering algorithm and the security key comprises: receiving, from a network entity, the indication of the ciphering algorithm and the security key, and wherein the network entity is a direct discovery name management function (DDNMF) in a home public land mobile network (HPLMN).

21. The method of claim 19, wherein the ciphering key is based on a discovery user confidentiality key (DUCK), the first set of time parameters, or a message-specific parameter, and wherein the message-specific parameter is a message integrity check (MIC) or a random string.

22. The method of claim 17, further comprising:
obtaining an indication of the scrambling algorithm and the scrambling key, wherein the scrambling algorithm is different from the ciphering algorithm and the scrambling key is different from the ciphering key.

23. The method of claim 22, wherein obtaining the indication of the scrambling algorithm and the scrambling key comprises: receiving, from a network entity, the indication of the scrambling algorithm and the scrambling key, and wherein the network entity is a direct discovery name management function (DDNMF) in a home public land mobile network (HPLMN).

24. The method of claim 22, wherein the scrambling key is a discovery user scrambling key (DUSK).

25. The method of claim 17, further comprising:
obtaining a mask from a network entity, wherein the first portion of the discovery message is indicated by the mask.

26. The method of claim 17, wherein a third portion of the discovery message is not scrambled, wherein the third portion is different from the first portion and the second portion.

27. The method of claim 17, wherein the discovery message is less than a defined size, and wherein the discovery message comprises an application layer group identifier (ID) code representing an application layer group ID, wherein the application layer group ID code is a hash of the application layer group ID.

28. The method of claim 17, further comprising:
transmitting, to a network entity, a discovery request message comprising a restricted proximity services (ProSe) application user identifier (RPAUID) associated with the UE, wherein the discovery request message further comprises a sidelink UE security capability representing a list of supported ciphering algorithms comprising the ciphering algorithm; and
receiving, from the network entity, a discovery response message comprising ProSe code, wherein the discovery response message further comprises a chosen ciphering algorithm in the list of supported ciphering algorithms associated with the UE.

29. The method of claim 17, wherein the first set of time parameters comprises a counter that is associated with a first time instance, and wherein the second set of time parameters comprises the counter that is associated with a second time instance.

30. A non-transitory computer-readable medium storing computer executable code at a user equipment (UE), the code when executed by at least one processor causes the at least one processor to:
obtain a discovery message, wherein a first portion of the discovery message is ciphered based on at least one of a ciphering key, a ciphering algorithm, or a first set of time parameters, wherein a second portion of the discovery message is scrambled based on at least one of a scrambling key, a scrambling algorithm, and a second set of time parameters, wherein the second portion is different from the first portion, wherein the second portion overlaps the first portion, wherein a size of the second portion is less than or equal to a size of a key derivation function associated with the scrambling key, wherein the scrambling algorithm is based on a time-hash-bitsequence keystream set to L least significant bits of an output of the key derivation function, and wherein L corresponds to a length of the discovery message to be scrambled;
descramble the discovery message based on at least one of the scrambling key, the scrambling algorithm, or the second set of time parameters;
decipher the discovery message based on at least one of the ciphering key, the ciphering algorithm, or the first set of time parameters; and
transmit, to a second UE, a response message in response to the discovery message, wherein the response message is a second discovery message that includes at least a response code.

* * * * *